(12) United States Patent
Ito

(10) Patent No.: US 12,034,353 B2
(45) Date of Patent: Jul. 9, 2024

(54) ELECTRIC MOTOR

(71) Applicant: YAMAHA HATSUDOKI KABUSHIKI KAISHA, Iwata (JP)

(72) Inventor: Jin Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 225 days.

(21) Appl. No.: 17/889,555

(22) Filed: Aug. 17, 2022

(65) Prior Publication Data

US 2023/0069321 A1 Mar. 2, 2023

(30) Foreign Application Priority Data

Aug. 30, 2021 (JP) .................................. 2021-140479

(51) Int. Cl.
*H02K 5/20* (2006.01)
*H02K 1/16* (2006.01)

(52) U.S. Cl.
CPC ............. *H02K 5/203* (2021.01); *H02K 1/165* (2013.01)

(58) Field of Classification Search
CPC ................................ H02K 1/165; H02K 5/203
See application file for complete search history.

(56) References Cited

U.S. PATENT DOCUMENTS

| | | | | |
|---|---|---|---|---|
| 5,519,269 A | * | 5/1996 | Lindberg | H02K 9/197 |
| | | | | 310/58 |
| 7,193,342 B2 | * | 3/2007 | Casey | H02K 9/197 |
| | | | | 310/58 |
| 9,099,900 B2 | * | 8/2015 | Glubrecht | H02K 5/203 |

FOREIGN PATENT DOCUMENTS

| | | |
|---|---|---|
| EP | 1271747 A1 | 1/2003 |
| EP | 2518865 A1 | 10/2012 |
| EP | 2658098 A1 | 10/2013 |
| EP | 3611828 A1 | 2/2020 |
| JP | S59222057 A | 12/1984 |
| JP | 2003224945 A | 8/2003 |
| JP | 2003244896 A | 8/2003 |
| JP | 2008042959 A | 2/2008 |
| JP | 2010-213412 A | 9/2010 |
| JP | 2016220329 A | 12/2016 |
| JP | 2020129887 A | 8/2020 |

OTHER PUBLICATIONS

Extended European Search Report in EP22192861.7, mailed Feb. 1, 2023, 9 pages.

* cited by examiner

*Primary Examiner* — Jue Zhang
(74) *Attorney, Agent, or Firm* — Keating & Bennett, LLP

(57) ABSTRACT

An electric motor includes a stator, a rotor, and a housing. A slot in a stator core of the stator includes a coil housing and a slot opening that opens the coil housing radially inward. A coil includes a coil end that protrudes in an axial direction from an axial end surface of the stator core. A plastic portion that is integral with the stator core includes a blocking portion that extends in the axial direction so as to block the slot opening, and a cylindrical wall that is coupled with the blocking portion. The cylindrical wall protrudes in the axial direction from the axial end surface of the stator core. The housing defines a coil end cooling channel in which a cooling liquid flows to cool the coil end, at a location radially outward from the cylindrical wall.

14 Claims, 20 Drawing Sheets

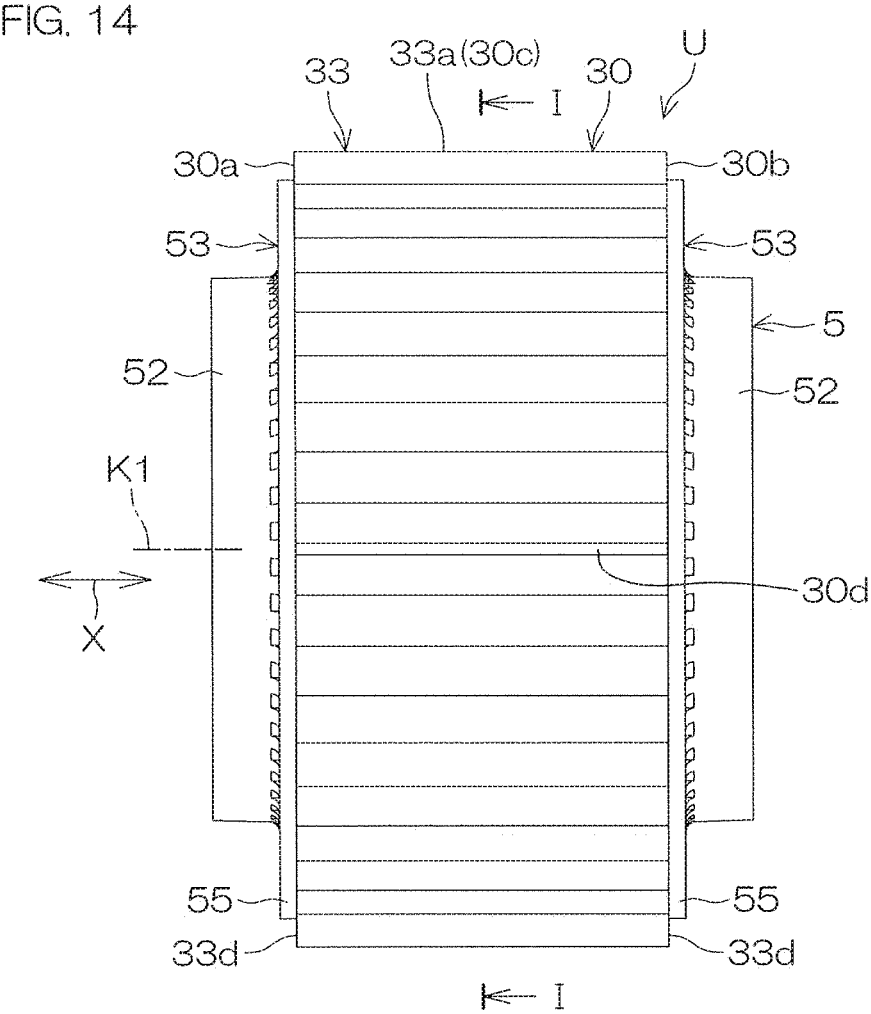

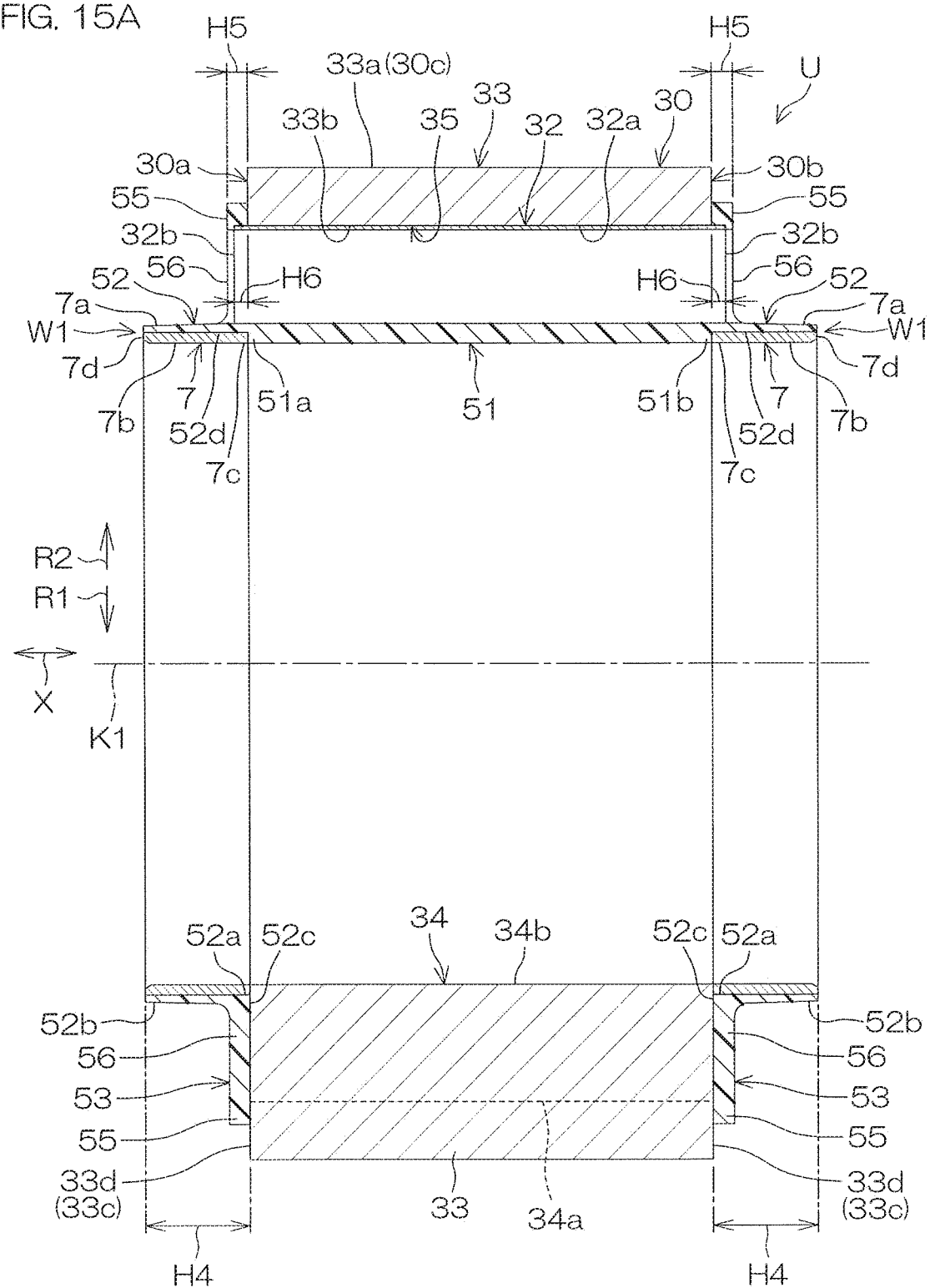

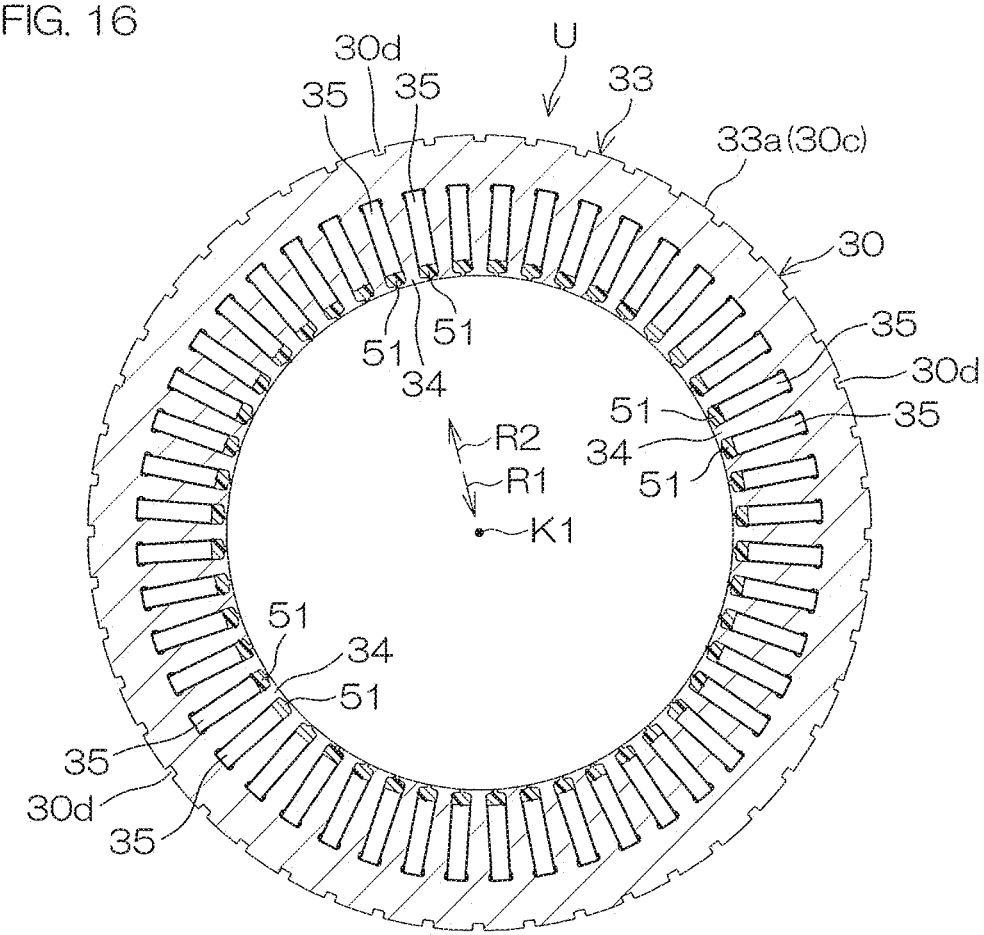

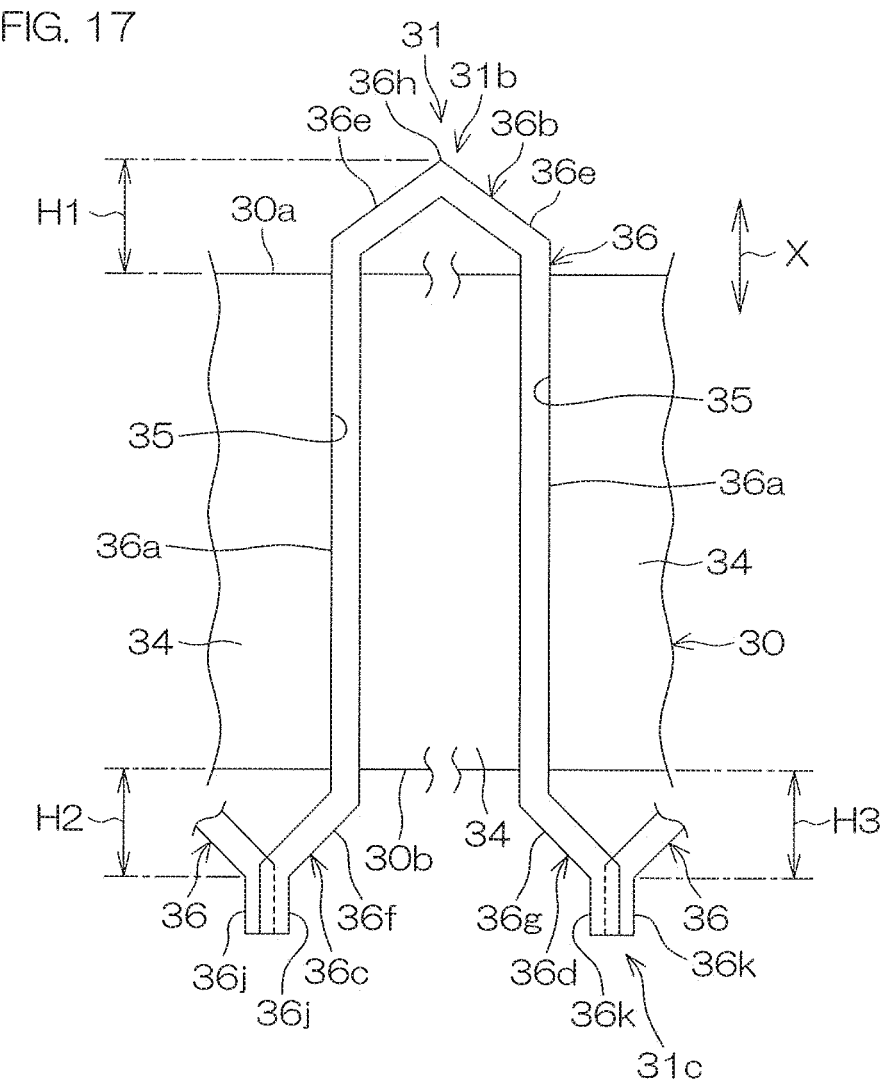

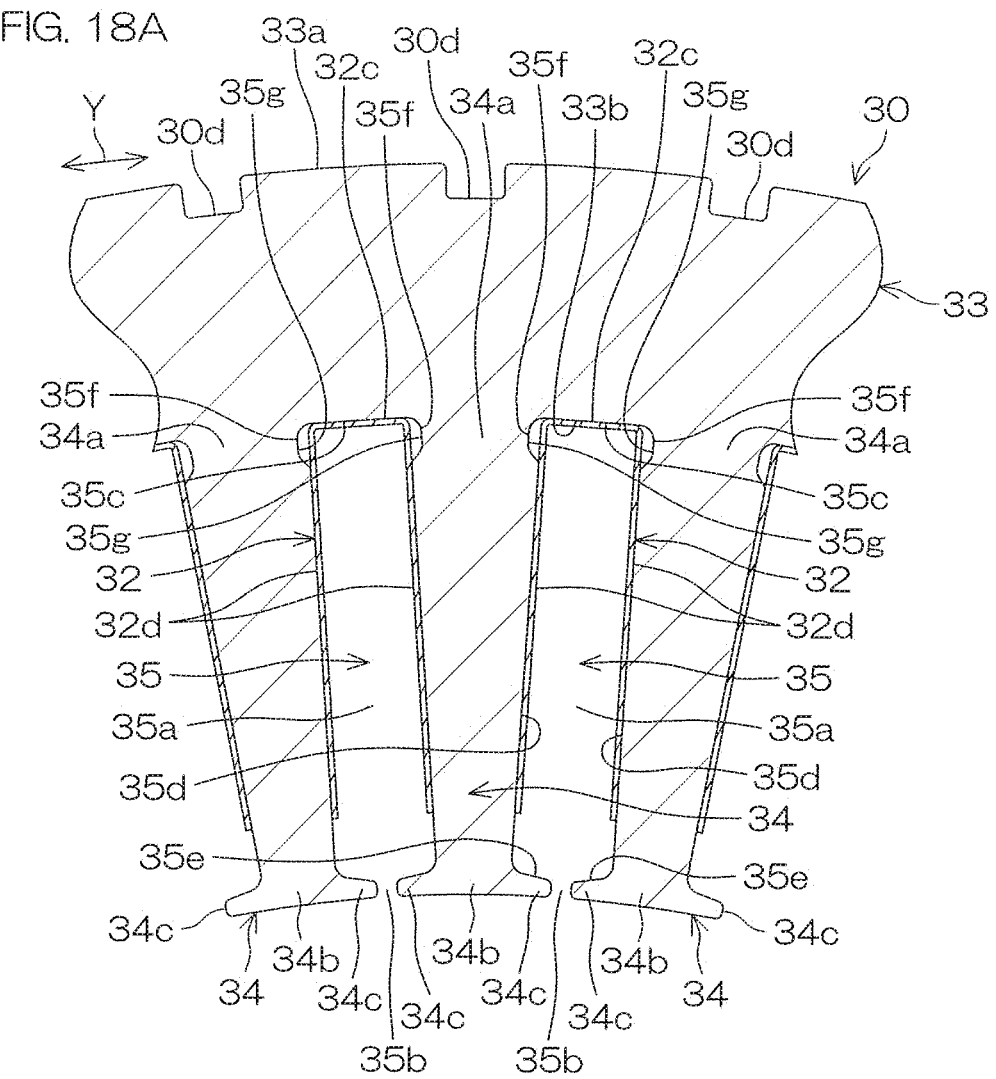

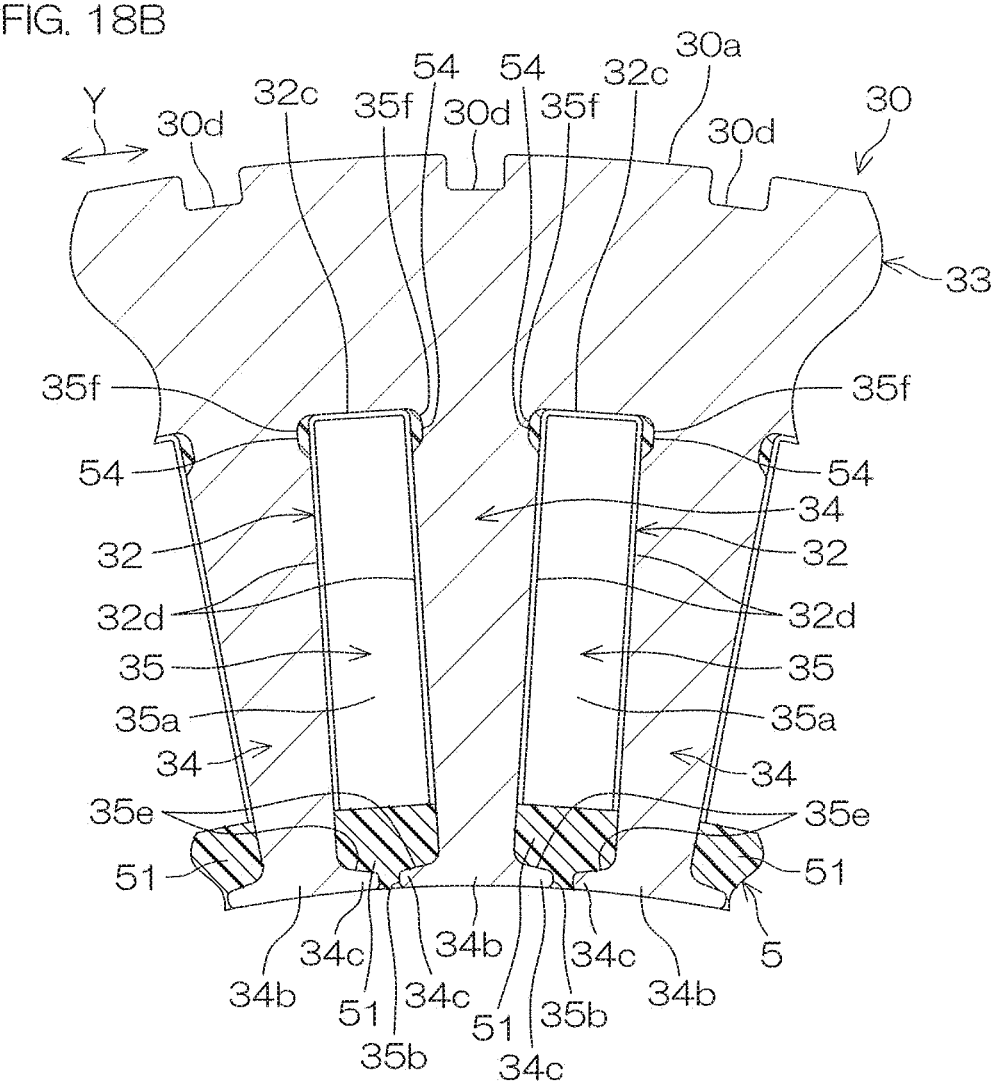

ELECTRIC MOTOR

CROSS REFERENCE TO RELATED APPLICATIONS

This application claims the benefit of priority to Japanese Patent Application No. 2021-140479 filed on Aug. 30, 2021. The entire contents of this application are hereby incorporated herein by reference.

BACKGROUND OF THE INVENTION

1. Field of the Invention

The present invention relates to an electric motor.

2. Description of the Related Art

The rotating electric machine disclosed in Japanese Unexamined Patent Publication No. 2010-213412 includes a cylindrical partition member for partitioning a stator housing chamber from a rotor housing chamber in an air gap, which is a gap between an inner periphery of the stator and the rotor. Both ends in an axial direction of the partition member are liquid-tightly supported by a housing for housing the stator and rotor. Through an introduction port provided in the housing, a coolant is supplied to the stator housing chamber from the outside. On the other hand, the coolant is exhausted from the stator housing chamber to the outside through an exhaust port provided in the housing.

Entry of the coolant into the rotor housing chamber is prevented by the partition member. Therefore, there is an advantage in that an increase in mechanical loss is suppressed, and degradation in performance of the rotating electric machine can be suppressed.

SUMMARY OF THE INVENTION

The inventor of preferred embodiments of the present invention described and claimed in the present application conducted an extensive study and research regarding electric motors, such as the one described above, and in doing so, discovered and first recognized new unique challenges and previously unrecognized possibilities for improvements as described in greater detail below.

In the rotating electric machine disclosed in Japanese Patent Application Publication No. 2010-213412, the partition member is located in the air gap, so that the air gap is increased. Accordingly, the magnetic flux density is lowered, and the rotating electric machine is degraded in performance. Therefore, preferred embodiments of the present invention provide electric motors that achieve excellent performance.

In order to overcome the previously unrecognized and unsolved challenges described above, preferred embodiments of the present invention provide electric motors each including a stator including a stator core and a coil, a rotor, a plastic portion, and a metal housing to house the stator and the rotor. The stator core includes a yoke extending in an axial direction along a rotational axis and annularly surrounding the rotational axis, a plurality of teeth located on an inner periphery of the yoke and spaced apart at intervals in a circumferential direction around the rotational axis, and a plurality of slots between adjacent teeth. Each of the plurality of slots includes a coil housing that houses the coil and a slot opening that opens the coil housing radially inward. The coil includes a coil end that protrudes in the axial direction from an axial end surface of the stator core. The rotor is spaced radially inward of the stator by an air gap and is rotatable around the rotational axis. The plastic portion is integral with the stator core. The plastic portion includes a blocking portion that extends in the axial direction so as to block the slot opening, and a cylindrical wall that is coupled to the blocking portion, protrudes farther in the axial direction than the axial end surface of the stator core, and is concentric with the stator core. The housing defines a coil end cooling channel in which a cooling liquid flows to cool the coil end, at a location radially outward from the cylindrical wall.

According to this structural arrangement, the plastic portion includes the blocking portion that extends in the axial direction so as to block the slot opening in the slot, and the plastic portion includes a cylindrical portion that is coupled to the blocking portion and protrudes farther in the axial direction than the axial end surface of the stator core. The coil end cooling channel is radially outward of the cylindrical portion. Entry of the cooling liquid from the inside of the slot into the rotor side is prevented by the blocking portion, and an increase in mechanical loss is prevented. Further, because the blocking portion is located in the slot opening, the air gap is freely set to any size. Therefore, the performance is increased.

In a preferred embodiment of the present invention, the plastic portion includes a covering portion that is coupled to the cylindrical wall and covers the axial end surface of the stator core. According to this structural arrangement, secure holding of the cylindrical wall is increased by providing the covering portion.

In a preferred embodiment of the present invention, the covering portion includes an annular covering portion that covers an axial end surface of the yoke. According to this structural arrangement, the secure holding of the cylindrical wall is further increased by the annular covering portion covering the axial end surface of the yoke.

In a preferred embodiment of the present invention, the annular covering portion covers a portion of the axial end surface of the yoke, and the axial end surface of the yoke includes an exposed portion which is exposed to the coil end cooling channel. According to this structural arrangement, the annular covering portion covers a portion of the axial end surface of the yoke to secure holding of the cylindrical wall. Moreover, the exposed portion of the axial end surface of the yoke is exposed to the coil end cooling channel, by which cooling performance is improved.

In a preferred embodiment of the present invention, the exposed portion is exposed to the coil end cooling channel at a location radially outward from the annular covering portion. According to this structural arrangement, the exposed portion has an increased area. Therefore, the cooling performance is improved.

In a preferred embodiment of the present invention, the covering portion includes an arm portion extending along an axial end surface of the plurality of teeth and couples an axial end portion of the cylindrical wall with the annular covering portion. According to this structural arrangement, the axial end portion of the cylindrical wall is coupled with the annular covering portion by the arm portion along the axial end surface of the plurality of teeth. Therefore, secure holding of the cylindrical portion is increased.

In a preferred embodiment of the present invention, each of the plurality of slots includes a corner portion defined by the inner periphery of the yoke and a wall surface of the plurality of teeth as viewed in the axial direction, and the plastic portion includes a reinforcing portion which extends along the corner portion in the axial direction, and is coupled with the arm portion. According to this structural arrangement, the reinforcing portion that extends along the corner portion of the slot in the axial direction is coupled with the arm portion. Therefore, a holding force to hold the arm portion on the stator core is increased.

In a preferred embodiment of the present invention, a pair of the covering portions are located on both sides of the stator core in the axial direction, and the reinforcing portion couples the arm portions of the pair of covering portions with each other. According to this structural arrangement, the arm portions of the pair of covering portions located on both sides in the axial direction of the stator core are coupled with each other by the reinforcing portion. Therefore, a holding force to hold the pair of covering portions on the stator core is increased.

In a preferred embodiment of the present invention, the electric motor further includes a metal ring including an outer peripheral surface covered by the cylindrical wall and which is held on the stator core. According to this structural arrangement, secure holding of the cylindrical wall is increased.

In a preferred embodiment of the present invention, the stator includes an insulation paper located in the coil housing, and the insulation paper includes a protruding portion which protrudes in the axial direction from the axial end surface of the stator core, and is held by the covering portion. According to this structural arrangement, the protruding portion of the insulation paper has a stable posture. Therefore, the stator core is reliably insulated from the coil.

In a preferred embodiment of the present invention, in terms of a protrusion height from the axial end surface of the stator core, a maximum protrusion height of the covering portion is higher than a maximum protrusion height of the protruding portion. According to this structural arrangement, the stator core is reliably insulated from the coil.

In a preferred embodiment of the present invention, the housing includes a cylindrical housing main body into which the stator core is inserted, and a communication channel which communicates with the coil end cooling channel is provided between an outer peripheral surface of the stator core and an inner peripheral surface of the housing main body. According to this structural arrangement, the stator core is directly cooled by a cooling liquid that flows through the communication channel.

In a preferred embodiment of the present invention, the communication channel is defined by an axial groove provided on the outer peripheral surface of the stator core at a location radially outward of the plurality of teeth. According to this structural arrangement, the stator core is directly cooled with a simple structure.

In a preferred embodiment of the present invention, the coil end cooling channel is filled with the cooling liquid. According to this structural arrangement, the cooling effect is high.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14 is a side view of the stator core assembly.
FIG. 15A is a longitudinal cross-sectional view of the stator core assembly, and corresponds to a cross-sectional view taken along H-H in FIG. 13.
FIG. 16 is a transverse cross-sectional view of the stator core assembly, and corresponds to a cross-sectional view taken along I-I in FIG. 14.
FIG. 17 is a schematic view showing a disposition example of a segment coil.
FIG. 18A is a transverse cross-sectional view of a main portion of the stator core, showing a state in which an insulation paper is located in a slot before forming a plastic portion.
FIG. 18B is a transverse cross-sectional view of a main part of the stator core assembly, and corresponds to a partially enlarged view of FIG. 16, showing a state in which the plastic portion is provided.

DETAILED DESCRIPTION OF THE PREFERRED EMBODIMENTS

Figure 1:
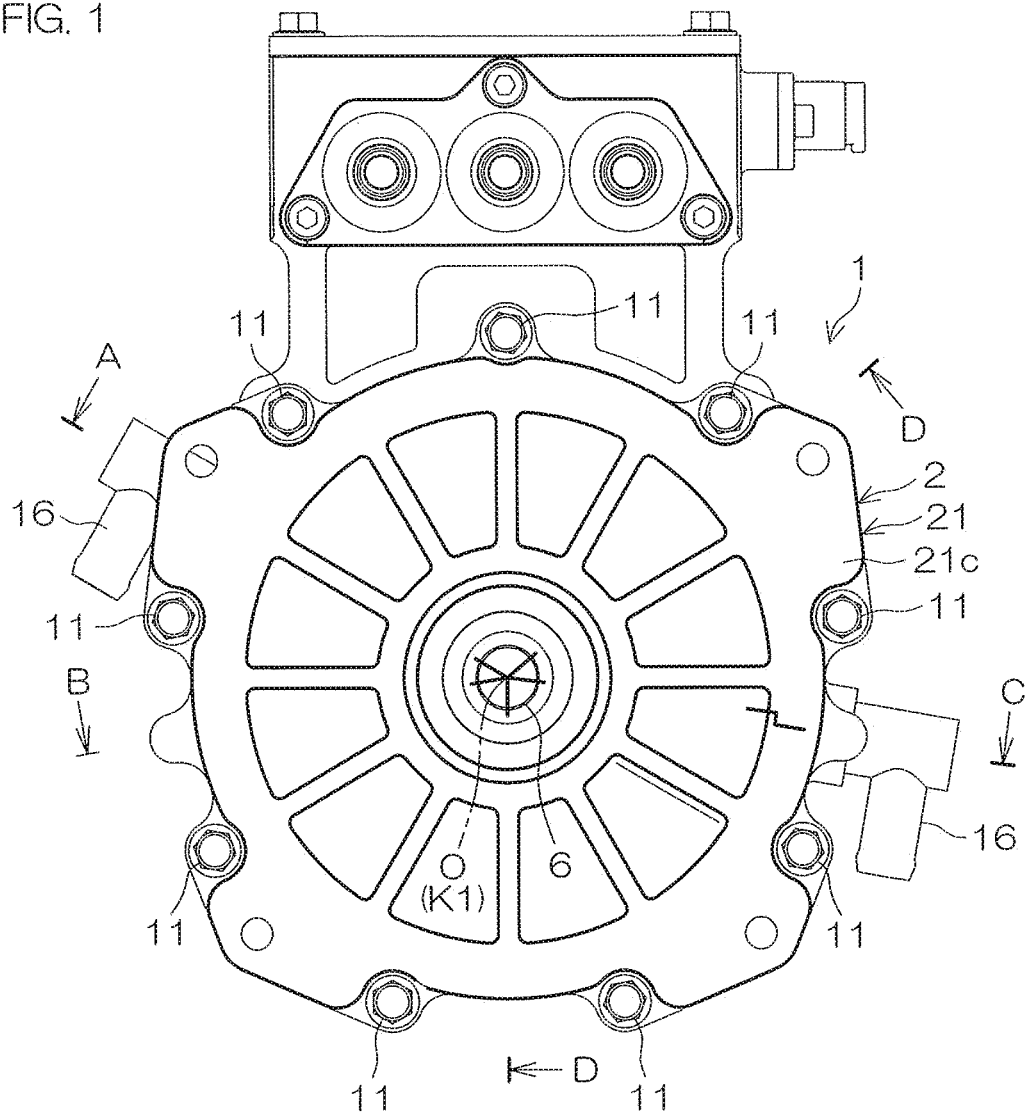
FIG. 1 is a front view of an electric motor according to a preferred embodiment of the present invention.
Figure 2:
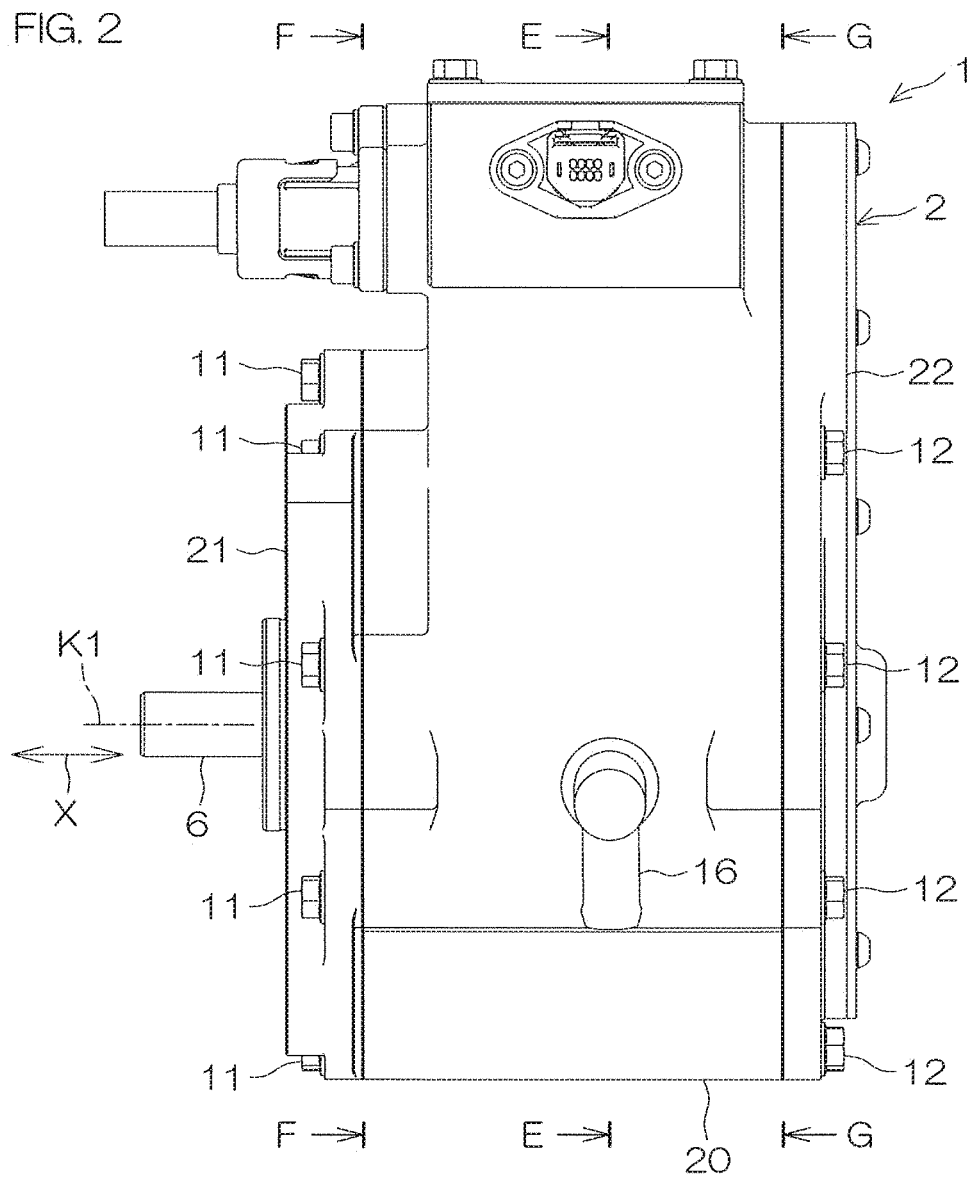
FIG. 2 is a side view of the electric motor.
Figure 3:
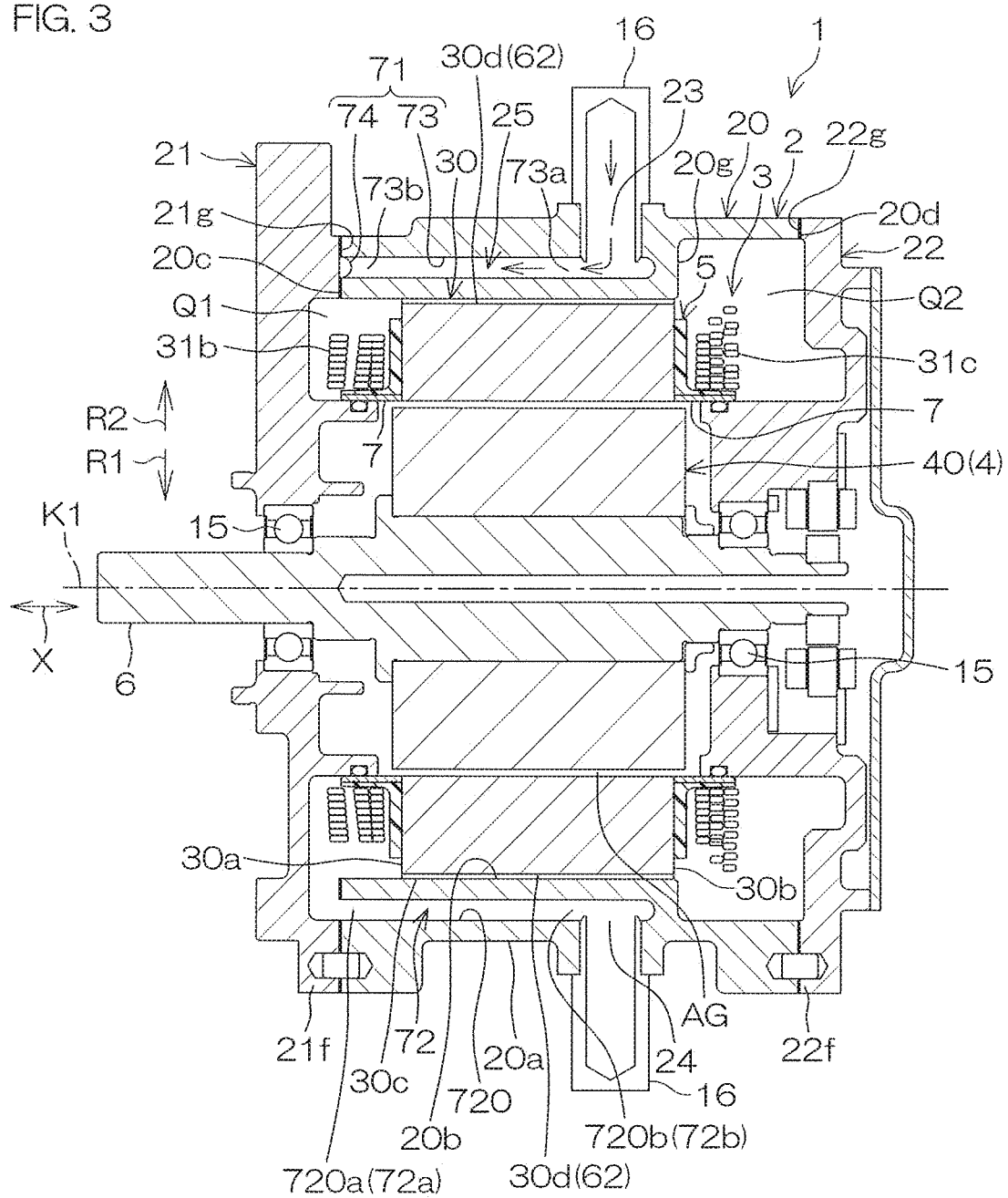
FIG. 3 is a longitudinal cross-sectional view of the electric motor, and corresponds to a cross-sectional view taken along A-C-C in FIG. 1.
Figure 4:
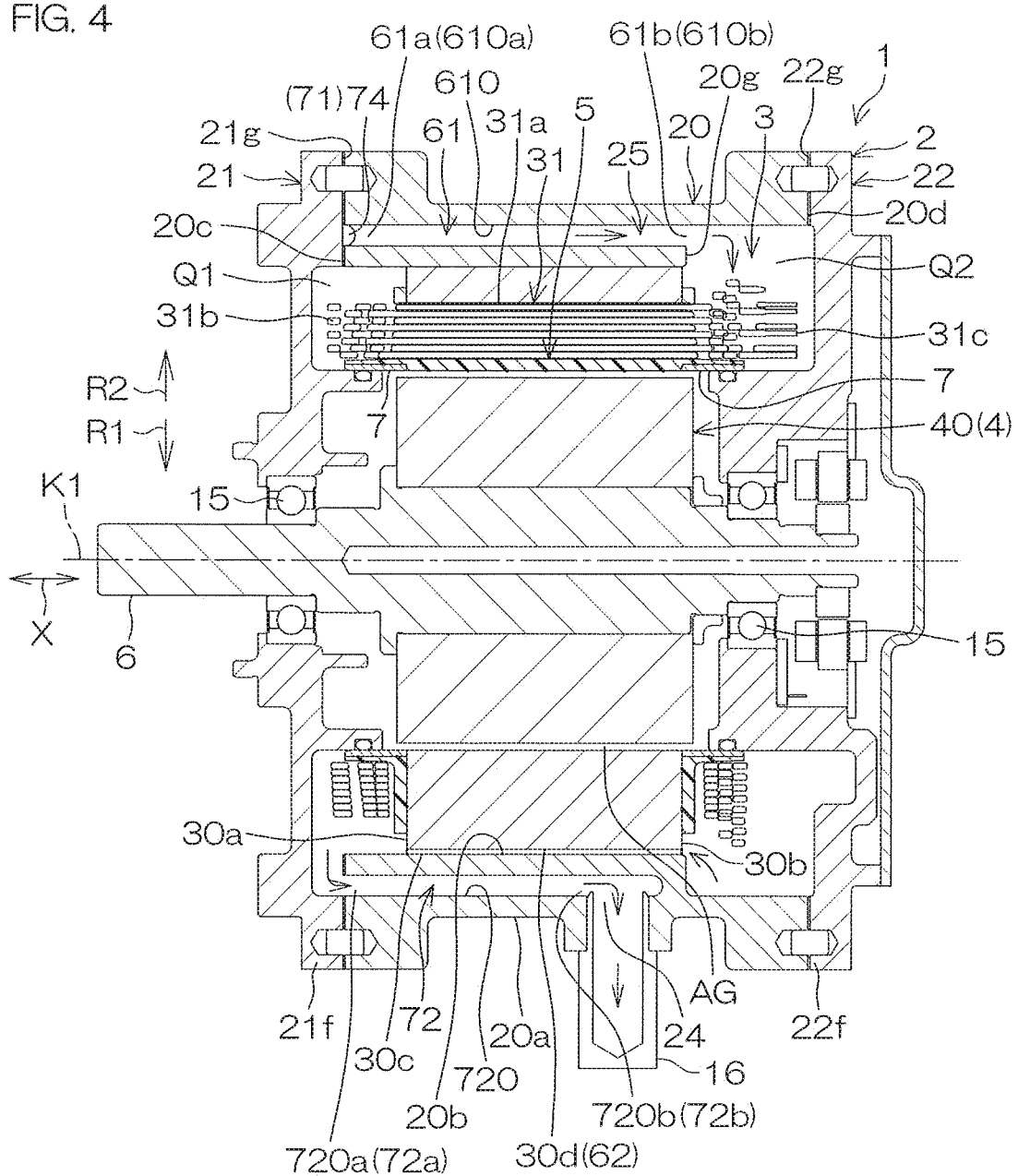
FIG. 4 is a longitudinal cross-sectional view of the electric motor, and corresponds to a cross-sectional view taken along B-C-C in FIG. 1.
Figure 5:
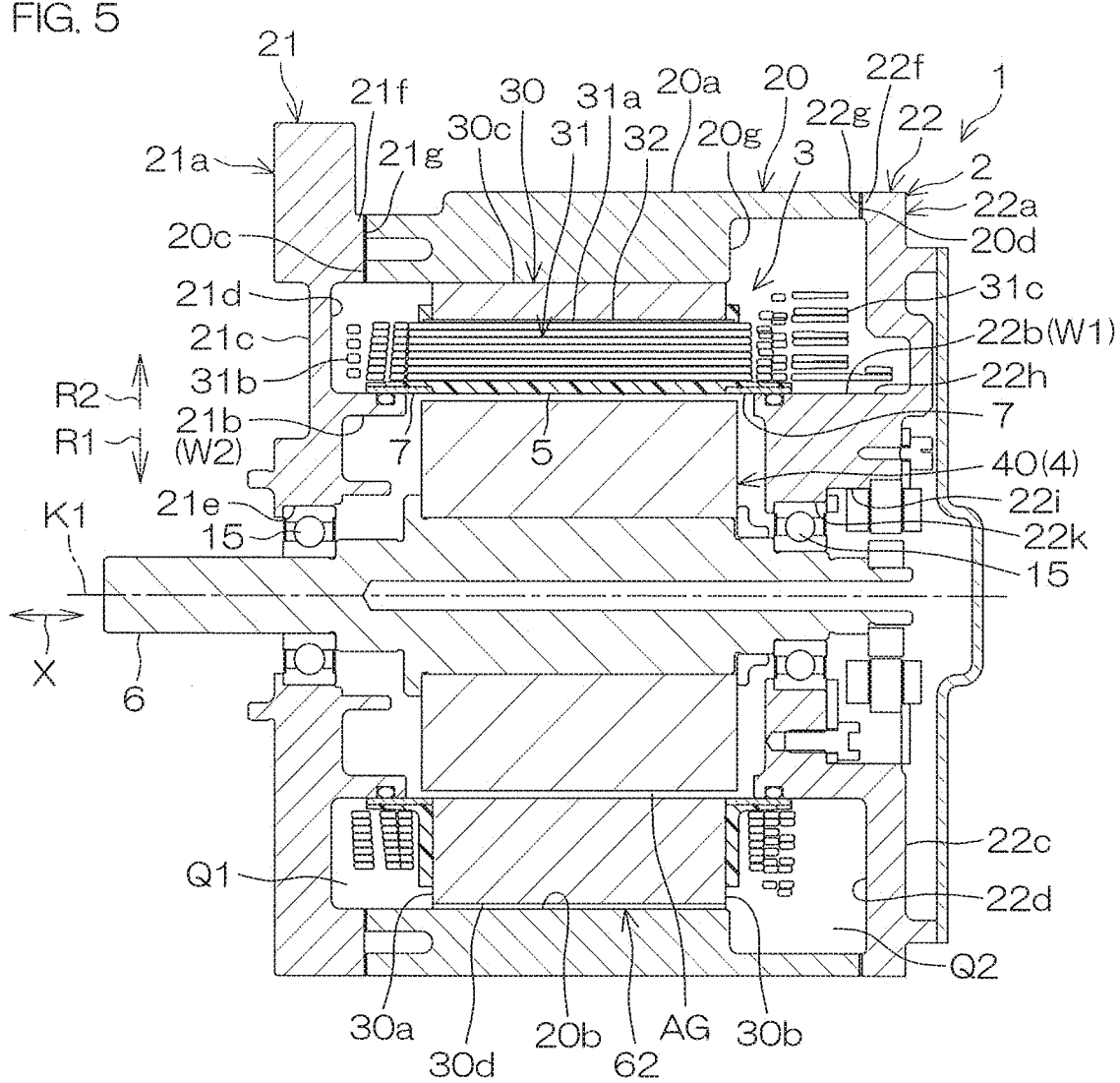
FIG. 5 is a longitudinal cross-sectional view of the electric motor, and corresponds to a cross-sectional view taken along D-D in FIG. 1.

FIG. 1 is a front view of an electric motor 1 according to a preferred embodiment of the present invention. FIG. 2 is a side view of the electric motor 1. FIG. 3 to FIG. 5 are longitudinal cross-sectional views of the electric motor 1. FIG. 3 corresponds to a cross-sectional view taken along A-O-C in FIG. 1. FIG. 4 corresponds to a cross-sectional view taken along B-O-C in FIG. 1. FIG. 5 corresponds to a cross-sectional view taken along D-D in FIG. 1.

As shown in FIG. 1 to FIG. 3, the electric motor 1 includes a housing 2, a stator 3, a rotor 4, a plastic portion 5, and an output shaft 6. As shown in FIG. 3, the housing 2 houses the stator 3 and the rotor 4. The output shaft 6 extends in an axial direction X that is along a rotational axis K1. The output shaft 6 is supported by the housing 2 so as to be rotatable around the rotational axis K1.

The rotor 4 rotates integrally with the output shaft 6. The rotor 4 is located radially inward R1 of the stator 3 through an air gap AG. The rotor 4 is rotatable around the rotational axis K1. The rotor 4 includes a rotor core 40 and permanent magnets (not shown) attached to the rotor core 40.

The stator 3 includes a stator core 30 and a coil 31. The coil 31 includes a first coil end 31b and a second coil end 31c as a pair of coil ends that protrude on both sides in the axial direction X of the stator core 30.

In the following, a direction that is perpendicular to the rotational axis K1 and is toward the rotational axis K1 is referred to as radially inward R1. On the other hand, a direction that is perpendicular to the rotational axis K1 and is away from the rotational axis K1 is referred to as radially outward R2.

First, description will be provided of the housing 2.

The housing 2 is made of metal. The housing 2 is made of, for example, an aluminum material. As shown in FIG. 2, the housing 2 includes a cylindrical housing main body 20, a first cover housing 21, and a second cover housing 22. Further, as shown in FIG. 3, the housing 2 includes a first cooling liquid port 23, a second cooling liquid port 24, and a cooling liquid channel 25.

As shown in FIG. 3, the housing main body 20 includes an outer peripheral surface 20a, an inner peripheral surface 20b, a first end surface 20c, and a second end surface 20d. The first cover housing 21 is fixed to the first end surface 20c of the housing main body 20 by fixing bolts 11, for example (refer to FIG. 2). The second cover housing 22 is fixed to the second end surface 20d of the housing main body 20 by fixing bolts 12, for example (refer to FIG. 2).

Figure 7:
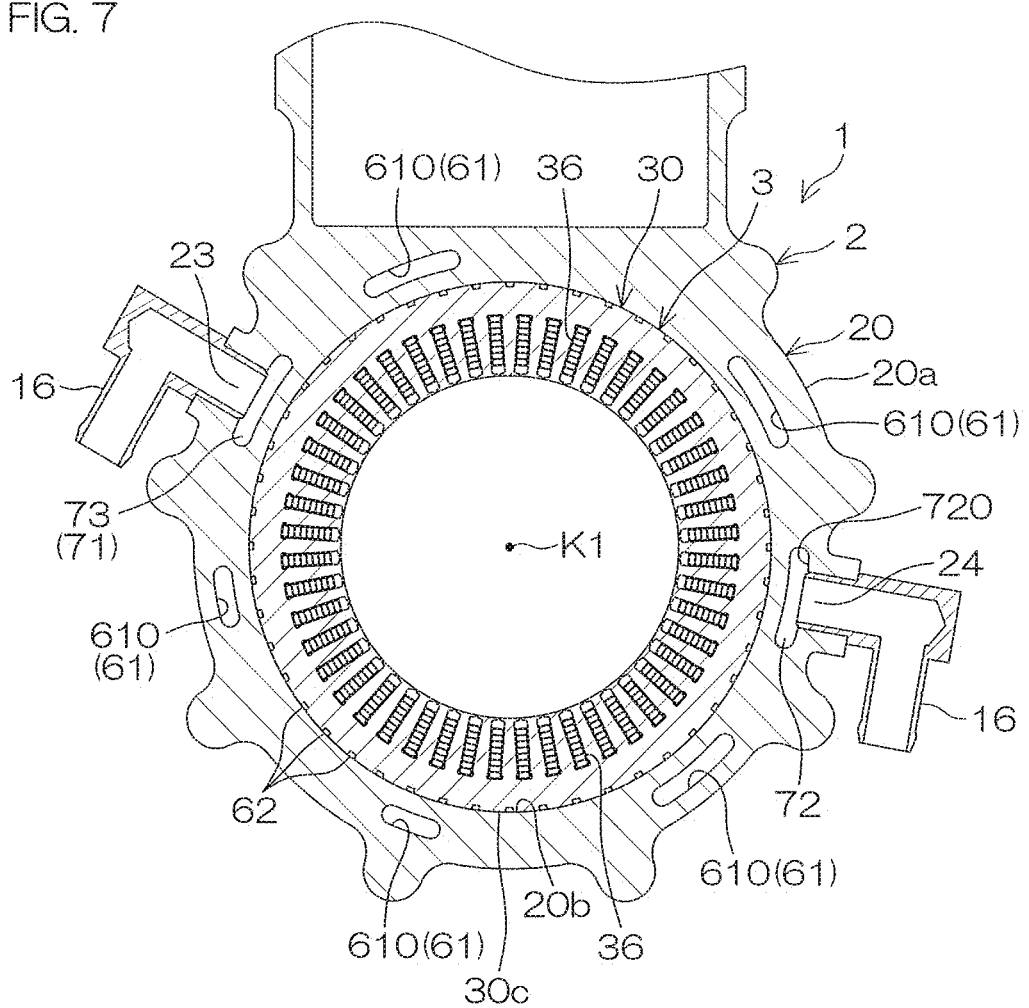
FIG. 7 is a transverse cross-sectional view of the electric motor, and corresponds to a cross-sectional view taken along E-E in FIG. 2.

As shown in FIG. 7 being a cross-sectional view taken along E-E in FIG. 2, each of the first cooling liquid port 23 and the second cooling liquid port 24 is defined by an opening hole that is open in the outer peripheral surface 20a of the housing main body 20. Into each of the first cooling liquid port 23 and the second cooling liquid port 24, an L-shaped pipe fitting 16 is screwed therein, for example.

As shown in FIG. 3, the cooling liquid channel 25 is defined by the housing 2 so as to cause a cooling liquid to flow between the first cooling liquid port 23 and the second cooling liquid port 24. The first cooling liquid port 23 functions as a cooling liquid inlet to introduce the cooling liquid into the cooling liquid channel 25. The second cooling liquid port 24 functions as a cooling liquid outlet to discharge the cooling liquid that has flowed through the cooling liquid channel 25. The cooling liquid channel 25 includes a first coil end cooling channel Q1 and a second coil end cooling channel Q2, a first communication channel 61 (refer to FIG. 4) and a second communication channel 62 (refer to FIG. 5), and a first connection channel 71 and a second connection channel 72.

The first coil end cooling channel Q1 includes the first coil end 31b. The second coil end cooling channel Q2 includes the second coil end 31c. The first coil end cooling channel Q1 and the second coil end cooling channel Q2 are annular channels that form annular shapes surrounding the rotational axis K1. The first coil end cooling channel Q1 and the second coil end cooling channel Q2 are filled with the cooling liquid.

Figure 8:
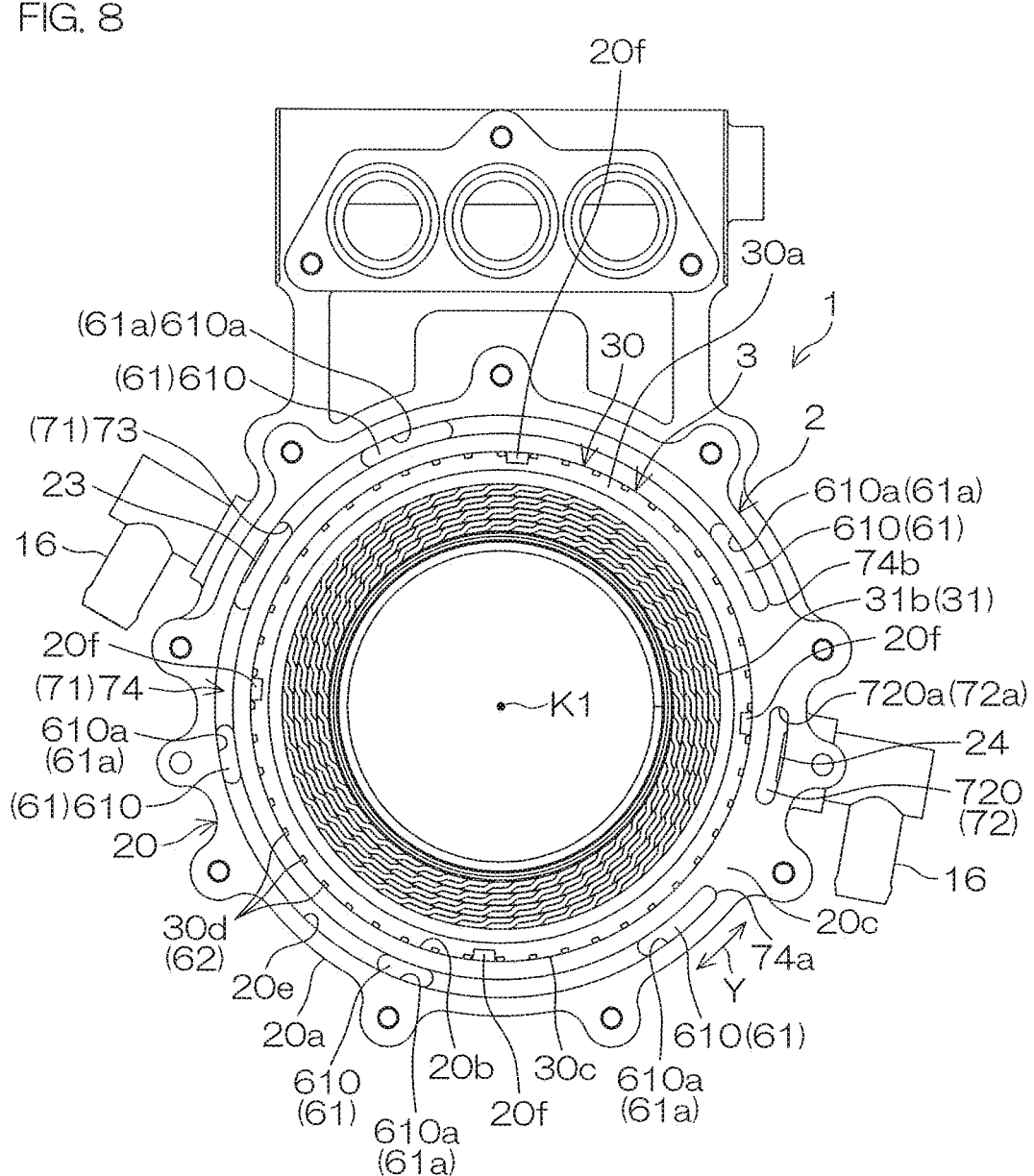
FIG. 8 is a transverse cross-sectional view of the electric motor, and corresponds to a cross-sectional view taken along F-F in FIG. 2.
Figure 9:
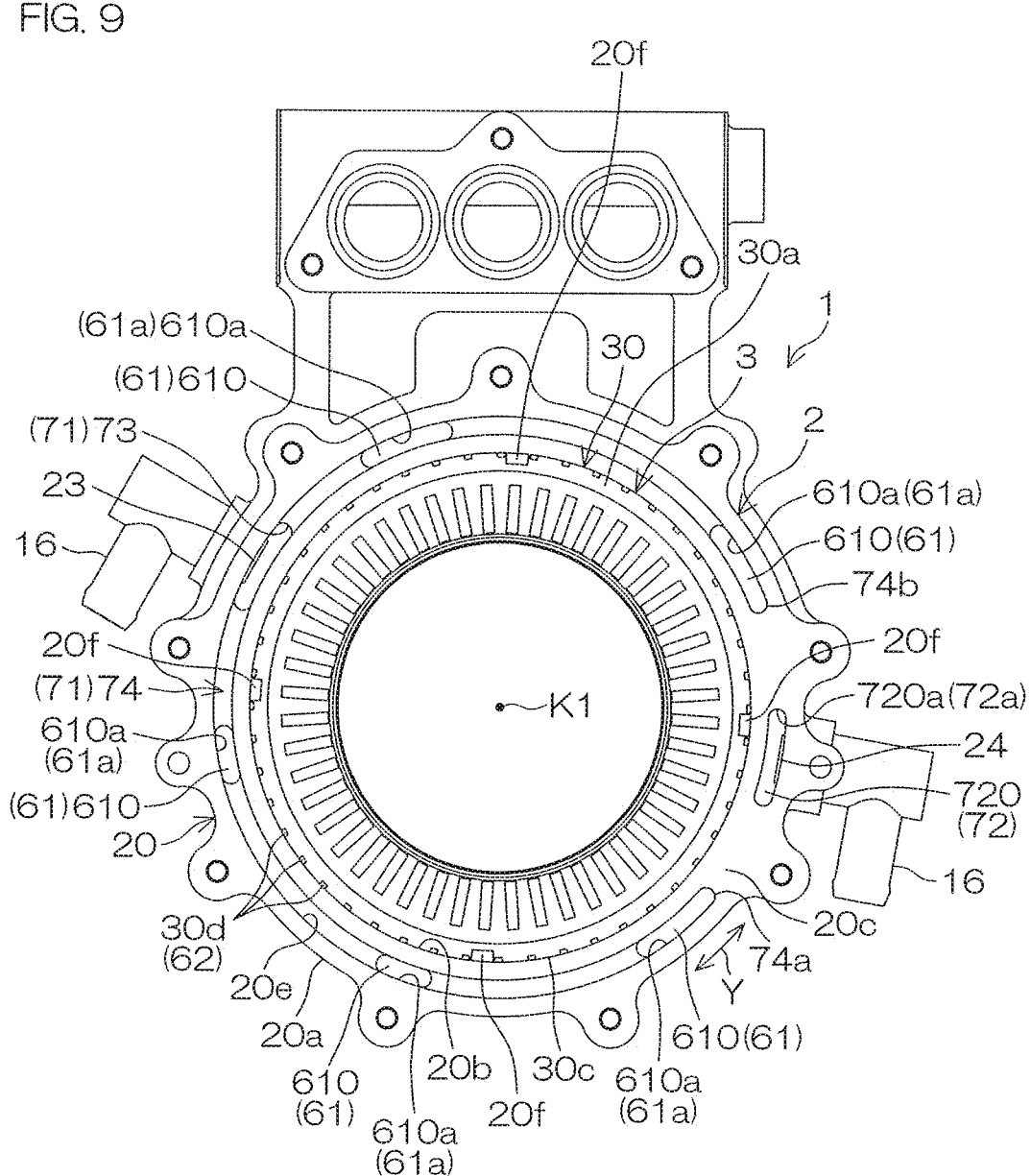
FIG. 9 is a transverse cross-sectional view of the electric motor, and corresponds to a view of FIG. 8 from which a coil is removed.

FIG. 8 is a cross-sectional view taken along F-F in FIG. 2, and FIG. 9 corresponds to a view of FIG. 8 from which the coil is removed. As shown in FIG. 3, the first connection channel 71 includes an axial channel 73 and a circumferential channel 74. As shown in FIG. 9, the circumferential channel 74 includes ends in a circumferential direction Y. The circumferential channel 74 is provided between a circumferential groove 20e provided on the first end surface 20c of the cylindrical housing main body 20 and an end surface 21g (refer to FIG. 3) of the first cover housing 21. The circumferential groove 20e includes ends in the circumferential direction Y. As shown in FIG. 3, the axial channel 73 is defined by an axial hole that extends in the axial direction X inside the wall thickness of the housing main body 20. The axial channel 73 includes one end 73a communicating with the first cooling liquid port 23 and the other end 73b communicating with the circumferential channel 74.

As shown in FIG. 4 being a cross-sectional view taken along B-C-C in FIG. 1, the first communication channel 61 includes a first end portion 61a and a second end portion 61b. The first communication channel 61 extends between the first end portion 61a and the second end portion 61b. The first communication channel 61 extends in the axial direction X inside the wall thickness of the housing main body 20.

As shown in FIG. 8, the first communication channel 61 is defined by a plurality of first axial holes 610 that are spaced apart in the circumferential direction Y around the rotational axis K1 and extend in the axial direction X. The first axial hole 610 includes a first end portion 610a that corresponds to the first end portion 61a of the first communication channel 61 and a second end portion 610b that corresponds to the second end portion 61b of the first communication channel 61.

Figure 10:
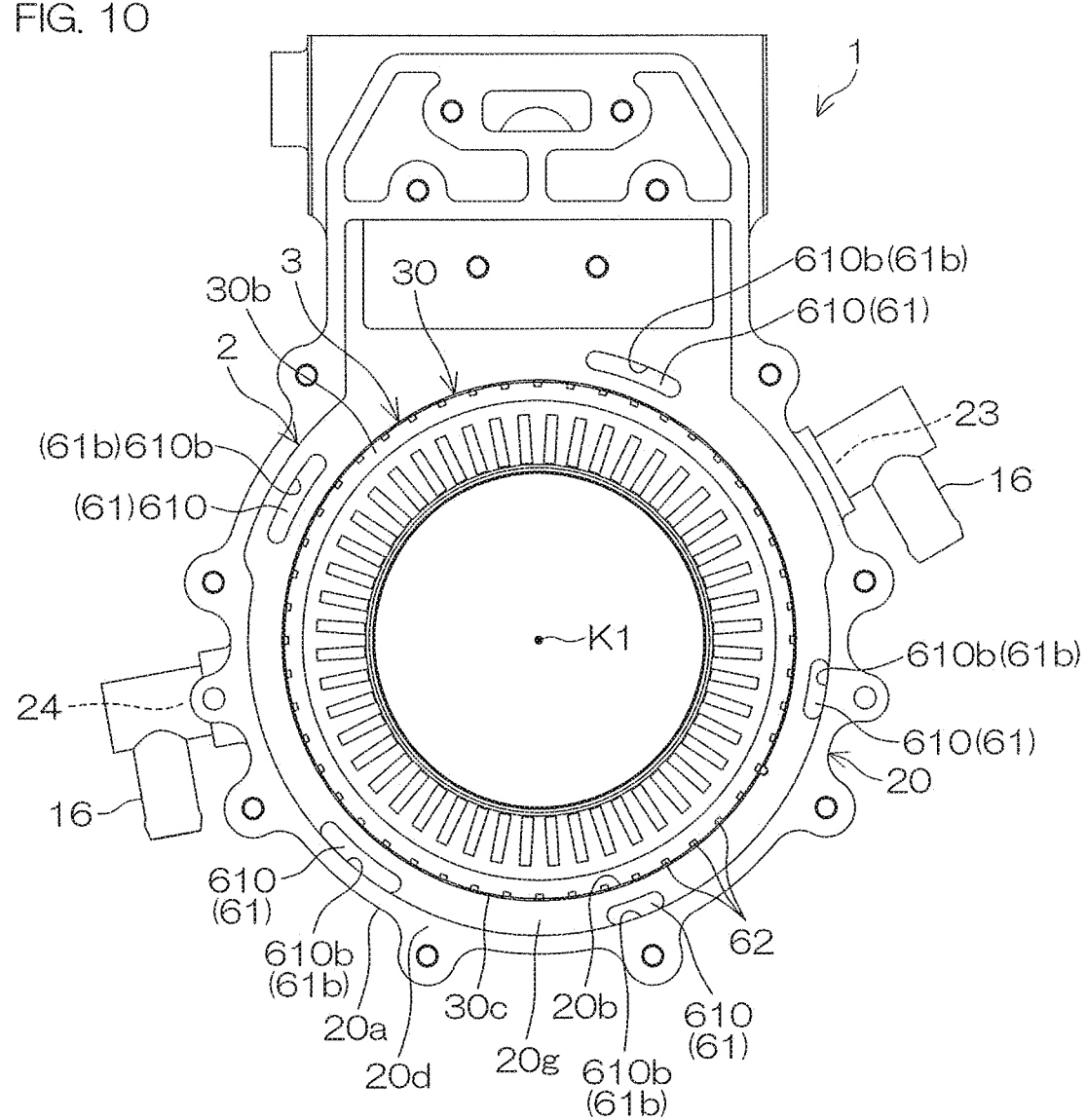
FIG. 10 is a transverse cross-sectional view of the electric motor, and corresponds to a cross-sectional view taken along G-G in FIG. 2.

As shown in FIG. 10 being a cross-sectional view taken along G-G in FIG. 2, at least either of intervals of the plurality of first axial holes 610 in the circumferential direction Y and cross-sectional areas of the plurality of first axial holes 610 are non-uniform. In the example of FIG. 10, both of the intervals of the plurality of first axial holes 610 in the circumferential direction Y and the cross-sectional areas of the plurality of first axial holes 610 are non-uniform. Without limitation to this example, either of the intervals and cross-sectional areas may be non-uniform, or both of the intervals and cross-sectional areas may be uniform.

As shown in FIG. 4, the first end portion 61a of the first communication channel 61 is located adjacent to the first coil end cooling channel Q1 in a state of being separated radially outward R2 from the first coil end cooling channel Q1. The first communication channel 61 is located farther radially outward R2 than the first coil end cooling channel Q1.

The first connection channel 71 makes the first end portion 61a communicate with the first cooling liquid port 23 (refer to FIG. 3 and FIG. 7). Specifically, as shown in FIG. 8, the first end portion 61a of the first communication channel 61 communicates with the circumferential channel 74 of the first connection channel 71. The circumferential channel 74 couples the first end portions 610a of the plurality of first axial holes 610 (first communication channel 61) with each other.

As shown in FIG. 4, the second end portion 61b of the first communication channel 61 (the second end portion 610b of the first axial hole 610) communicates with the second coil end cooling channel Q2. As shown in FIG. 10, the second end portion 61b of the first communication channel 61 is opened in an annular step portion 20g that is provided on the inner peripheral surface 20b of the housing main body 20 and faces the second cover housing 22.

As shown in FIG. 4, the second communication channel 62 extends between the first coil end cooling channel Q1 and the second coil end cooling channel Q2 so as to communicate the first coil end cooling channel Q1 and the second coil end cooling channel Q2 with each other. The second communication channel 62 is provided between the inner peripheral surface 20b of the housing main body 20 and an outer peripheral surface 30c of the stator core 30. Specifically, the second communication channel 62 includes a plurality of axial grooves 30d (refer to FIG. 13) that are provided on the outer peripheral surface 30c of the stator core 30 and spaced apart in the circumferential direction Y. The second communication channel 62 is defined by the plurality of axial grooves 30d and the inner peripheral surface 20b of the housing main body 20. The first communication channel 61 is located farther radially outward R2 than the second communication channel 62.

Figure 6:
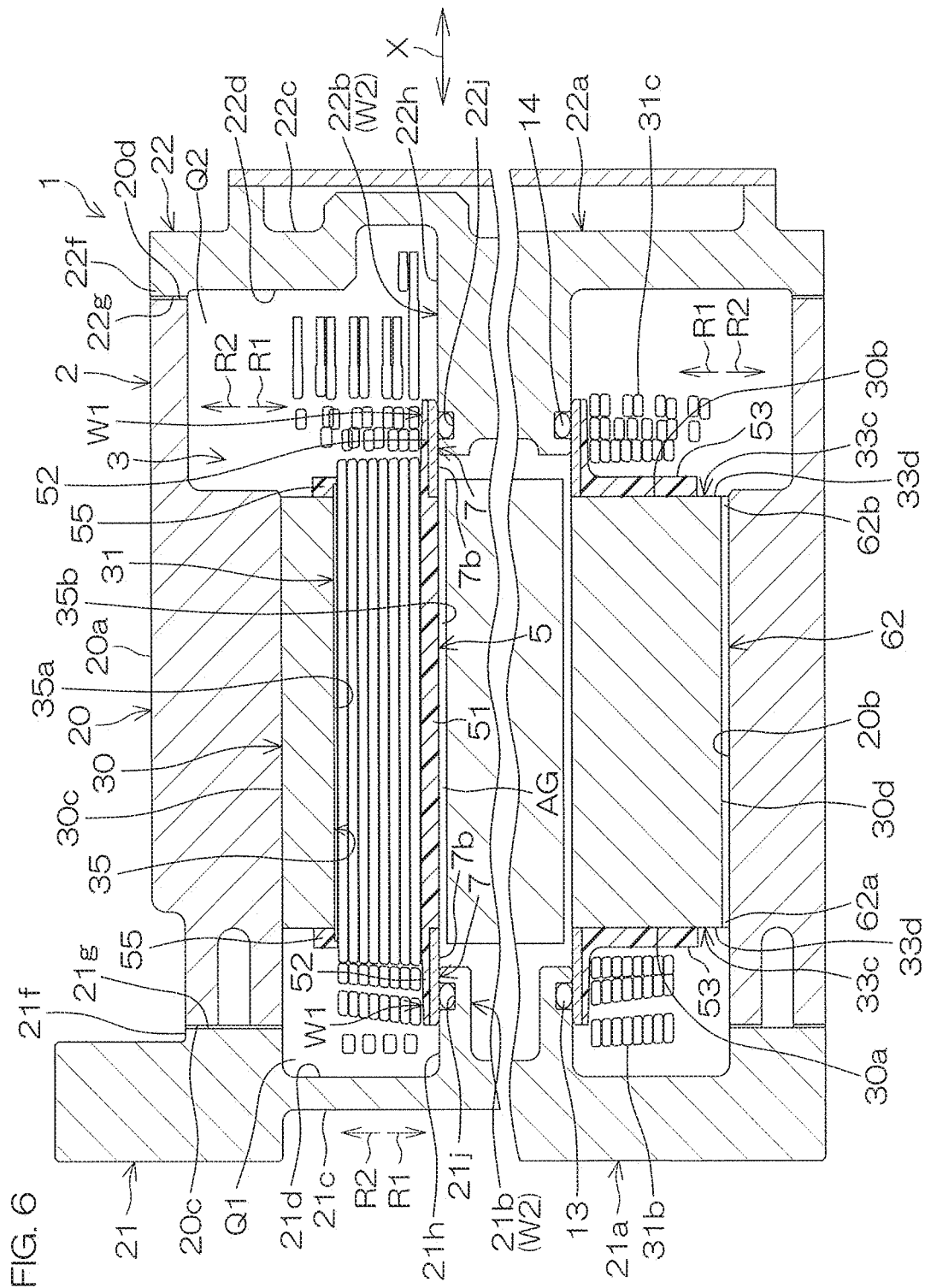
FIG. 6 is an enlarged transverse cross-sectional view of the electric motor, and corresponds to a partially enlarged view of FIG. 5.

As shown in FIG. 6, which is a partially enlarged view of FIG. 5, the second communication channel 62 includes a first end portion 62a and a second end portion 62b. The first end portion 62a of the second communication channel 62 communicates with the first coil end cooling channel Q1. The second end portion 62b of the second communication channel 62 communicates with the second coil end cooling channel Q2.

As shown in FIG. 3, the second connection channel 72 makes the first coil end cooling channel Q1 communicate with the second cooling liquid port 24 as the cooling liquid outlet. The second connection channel 72 includes a first end portion 72a and a second end portion 72b. The first end portion 72a of the second connection channel 72 communicates with the first coil end cooling channel Q1. The second end portion 72b of the second connection channel 72 communicates with the second cooling liquid port 24. The second connection channel 72 includes a second axial hole 720 that extends in the axial direction X inside the wall thickness of the housing main body 20. The second axial hole 720 includes a first end portion 720a that corresponds to the first end portion 72a of the second connection channel 72 and a second end portion 720b that corresponds to the second end portion 72b of the second connection channel 72.

As shown in FIG. 8 being a cross-sectional view taken along F-F in FIG. 2, the circumferential channel 74 includes a pair of circumferential end portions 74a, 74b. One end (first end portion 72a) of the second connection channel 72 including the second axial hole 720 is located at a position spaced apart in the circumferential direction Y with respect to the pair of circumferential end portions 74a, 74b of the circumferential channel 74.

As shown in FIG. 3, the cooling liquid channel 25 causes the cooling liquid having flowed in from the first cooling liquid port 23 as the cooling liquid inlet to flow to the first connection channel 71. As shown in FIG. 4, the cooling liquid channel 25 further causes the cooling liquid to flow from the first connection channel 71, through the first communication channel 61, the second coil end cooling channel Q2, the second communication channel 62, the first coil end cooling channel Q1, and the second connection channel 72 in order, to the second cooling liquid port 24 (refer to FIG. 7) as the cooling liquid outlet. The first and second coil ends 31b and 31c are thus cooled. Further, the housing 2 and the stator core 30 are cooled.

As shown in FIG. 5, the first cover housing 21 includes a main plate 21a and a cylindrical wall 21b (second cylindrical wall W2). The main plate 21a includes an outer side surface 21c, an inner side surface 21d, a bearing holding hole 21e, and an annular projection 21f.

The annular projection 21f is provided on the inner side surface 21d in an annular shape centered on the rotational axis K1. An end surface 21g of the annular projection 21f corresponds to the end surface of the first cover housing 21.

The end surface 21g of the first cover housing 21 covers the first end surface 20c of the housing main body 20 through a gasket (not shown). The gasket provides a seal between the first end surface 20c of the housing main body 20 and the end surface 21g of the first cover housing 21. Although not illustrated, in FIG. 8, the gasket surrounds the circumferential groove 20e that provides the circumferential channel 74, and the opening of the first end portion 72a of the second connection channel 72, respectively, so as to prevent the circumferential channel 74 and the second connection channel 72 from communicating with each other.

As shown in FIG. 5, the cylindrical wall 21b extends in the axial direction X from the inner side surface 21d. The cylindrical wall 21b has a cylindrical shape surrounding the rotational axis K1. As shown in FIG. 6, the cylindrical wall 21b includes an outer peripheral surface 21h that includes a cylindrical surface centered on the rotational axis K1 and a housing groove 21j provided on the outer peripheral surface 21h. In the housing groove 21j, a seal member 13 is housed, which is, for example, an O-ring.

As shown in FIG. 5, the second cover housing 22 includes a main plate 22a and a cylindrical wall 22b (second cylindrical wall W2). The main plate 22a includes an outer side surface 22c, an inner side surface 22d, and an annular projection 22f.

The annular projection 22f is provided on the inner side surface 22d of the main plate 22a in an annular shape surrounding the rotational axis K1. An end surface 22g of the annular projection 22f corresponds to an end surface of the second cover housing 22. The end surface 22g of the second cover housing 22 covers the second end surface 20d of the housing main body 20 through a gasket (not shown). The gasket provides a seal between the second end surface 20d of the housing main body 20 and the end surface 22g of the second cover housing 22.

The cylindrical wall 22b extends in the axial direction X from the inner side surface 22d of the main plate 22a. As shown in FIG. 6, the cylindrical wall 22b has a cylindrical shape surrounding the rotational axis K1. The cylindrical wall 22b includes an outer peripheral surface 22h, an inner peripheral surface 22i, a housing groove 22j, and a bearing holding portion 22k.

The outer peripheral surface 22h of the cylindrical wall 22b includes a cylindrical surface centered on the rotational axis K1. The housing groove 22j extends in the circumferential direction of the outer peripheral surface 22h. In the housing groove 22j, a seal member 14 is housed, which is, for example, an O-ring. The inner peripheral surface 22i of the cylindrical wall 22b includes a cylindrical surface centered on the rotational axis K1. The bearing holding portion 22k is provided in the inner peripheral surface 22i of the cylindrical wall 22b.

As shown in FIG. 5, the output shaft 6 is rotatably supported by the housing 2 through a pair of bearings 15, 15 held by an inner peripheral surface of the bearing holding hole 21e of the first cover housing 21 and the bearing holding portion 22k of the second cover housing 22. The pair of bearings 15, 15 are, for example, sealed bearings. The rotor 4 includes the rotor core 40 that is able to rotate integrally with the output shaft 6 and permanent magnets (not shown) located on the rotor core 40 at equal intervals in the circumferential direction.

Next, description will be provided of the stator 3.

As shown in FIG. 5, the stator 3 includes the stator core 30, the coil 31, and an insulation paper 32 (refer to FIG. 18A as well). The stator core 30 is constructed by laminating a plurality of plate-shaped electromagnetic steel plates. The stator core 30 includes a first axial end surface 30a and a second axial end surface 30b as a pair of axial end surfaces and the outer peripheral surface 30c. The stator core 30 is fitted to the inner peripheral surface 20b of the housing main body 20. The stator core 30 is press-fitted or shrink-fitted into the housing 2 (housing main body 20) in some cases.

Figure 11:
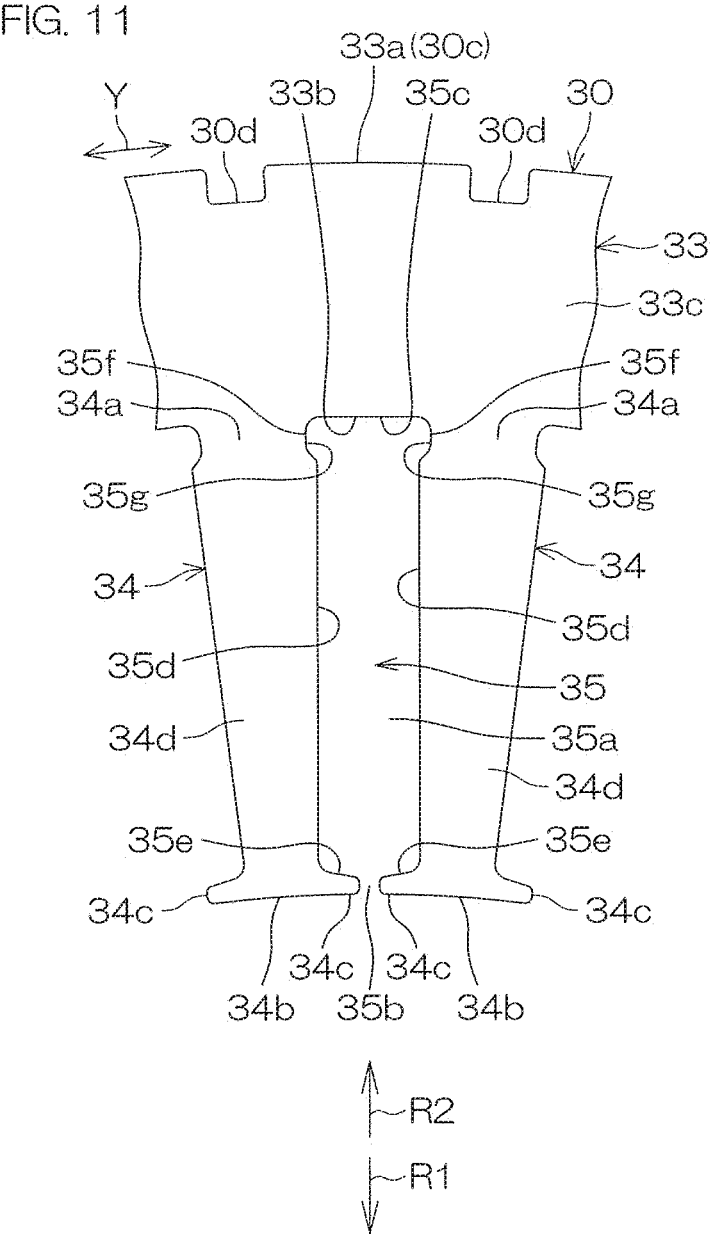
FIG. 11 is a partially enlarged view of an axial end surface of a stator core.

FIG. 11 is an enlarged view of a main portion of the stator core 30. As shown in FIG. 11, the stator core 30 includes a yoke 33, a plurality of teeth 34, and a plurality of slots 35. The yoke 33 has a shaft shape extending in the axial direction X along the rotational axis K1 and an annular shape surrounding the rotational axis K1. The yoke 33 includes an outer periphery 33a, an inner periphery 33b, and a pair of axial end surfaces 33c. The plurality of teeth 34 are located on the inner periphery 33b of the yoke 33 at intervals in the circumferential direction Y around the rotational axis K1.

Figure 12:
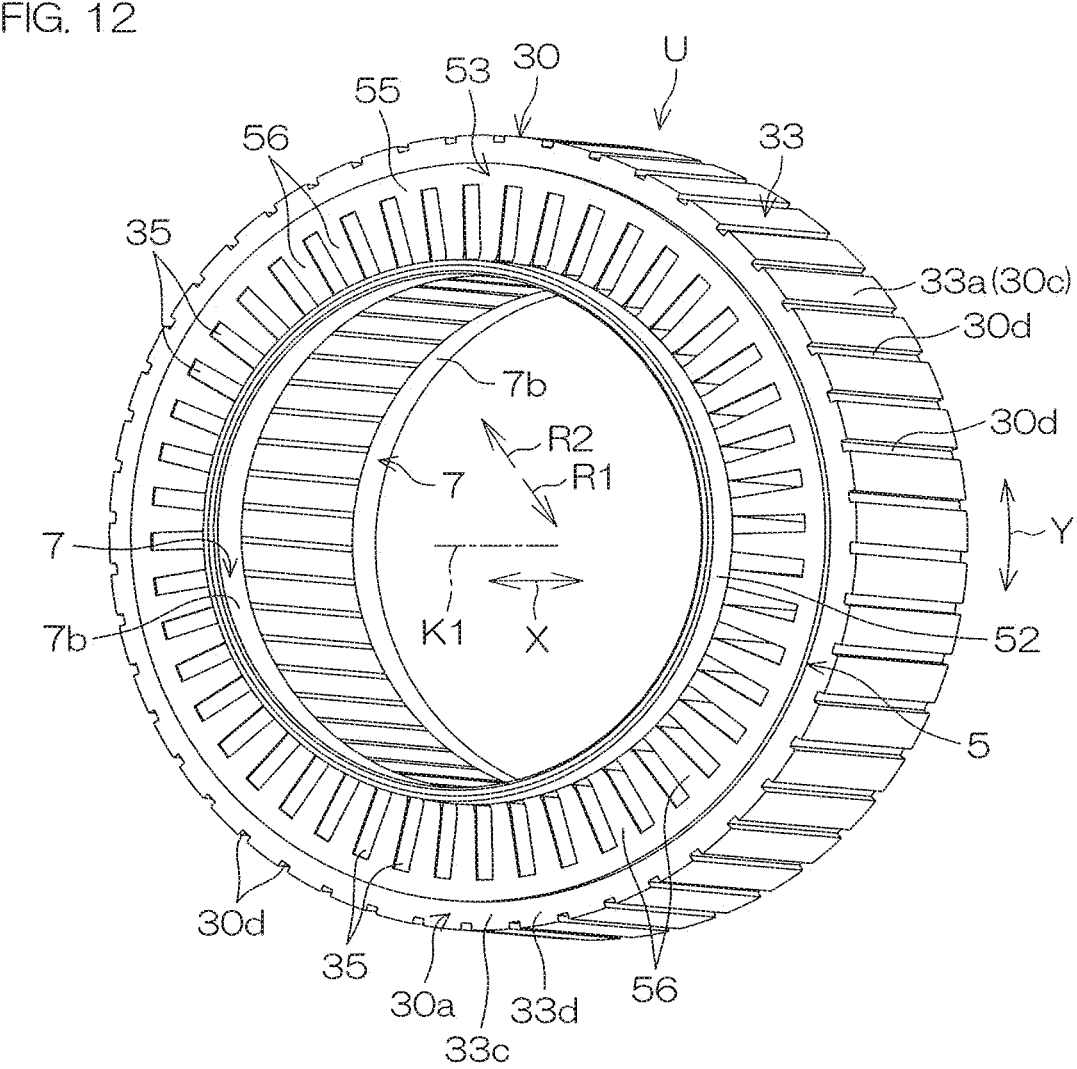
FIG. 12 is a perspective view of a stator core assembly including the stator core, a plastic portion, and a metal ring.

As shown in FIG. 12, the axial grooves 30d defining the second communication channel 62 (refer to FIG. 8) are located on the outer periphery 30c of the stator core 30 (the outer periphery 33a of the yoke 33) at equal intervals in the circumferential direction Y. As shown in FIG. 11, the axial grooves 30d are located radially outward R2 of the teeth 34. Specifically, the axial grooves 30d are located radially outward R2 of central positions in the circumferential direction Y of the teeth 34. The axial grooves 30d may be located radially outward R2 of all the teeth 34, or may be located radially outward R2 of every two or more teeth 34 in the circumferential direction Y.

As shown in FIG. 8, the housing main body 20 includes a plurality of projections 20f that protrude radially inward R1 from the inner peripheral surface 20b. The plurality of projections 20f are spaced apart in the circumferential direction Y. The projections 20f position the stator core 30 in the axial direction X by making contact with the first axial end surface 30a of the stator core 30. The projections 20f make contact with the first axial end surface 30a at positions to avoid openings of the axial grooves 30d that are opened in the first axial end surface 30a.

The positioning of the stator core 30 in the axial direction X may be performed, in an assembly step, by using jigs (not shown). In that case, it is not necessary to provide the projections 20f.

The plurality of teeth 34 protrude radially inward R1 from the inner periphery 33b of the yoke 33. Each of the teeth 34 includes a base end 34a and a tip end 34b. The base end 34a is coupled with the yoke 33. The tip end 34b is located radially inward R1 relative to the base end 34a. The tip end 34b includes a pair of protrusions 34c that protrude on both sides in the circumferential direction Y.

Between the adjoining teeth 34 in the circumferential direction Y, the slots 35 are provided. The teeth 34 and the slots 35 are alternately located in the circumferential direction Y. The slots 35 penetrate the stator core 30 in the axial direction X.

The slot 35 includes a coil housing portion 35a and a slot opening portion 35b. The coil housing portion 35a houses the coil 31. The slot opening portion 35b is provided between the protrusions 34c of adjacent teeth 34. The slot opening portion 35b opens the coil housing portion 35a radially inward R1.

An inner wall surface of the slot 35 includes a bottom wall surface 35c, a pair of side wall surfaces 35d, and a pair of holding wall surfaces 35e. The bottom wall surface 35c is defined by the inner periphery 33b of the yoke 33 and faces radially inward R1. The pair of side wall surfaces 35d are defined by side surfaces of adjacent teeth 34 and oppose each other in the circumferential direction Y. The pair of holding wall surfaces 35e correspond to wall surfaces of the pair of protrusions 34c and are surfaces facing radially outward R2.

A pair of corner portions 35f are defined by the pair of side wall surfaces 35d (wall surfaces of the teeth 34) and the bottom wall surface 35c (the inner periphery 33b of the yoke 33). The slot 35 includes the corner portions 35f. A portion of the side wall surface 35d that define each of the corner portions 35f includes a curved concave inner surface 35g. Each of the corner portions 35f is thus expanded in the circumferential direction Y.

Figure 13:
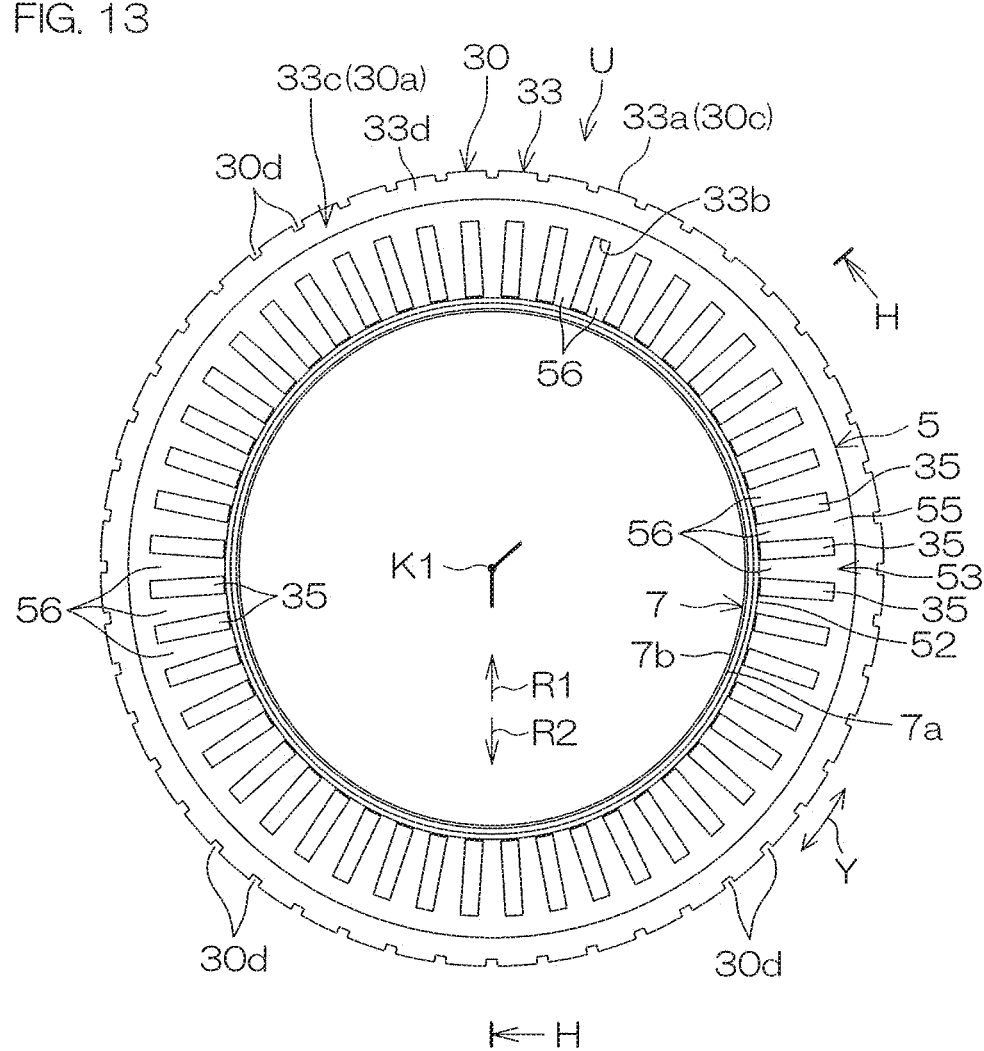
FIG. 13 is a plan view of the stator core assembly.
Figure 15B:
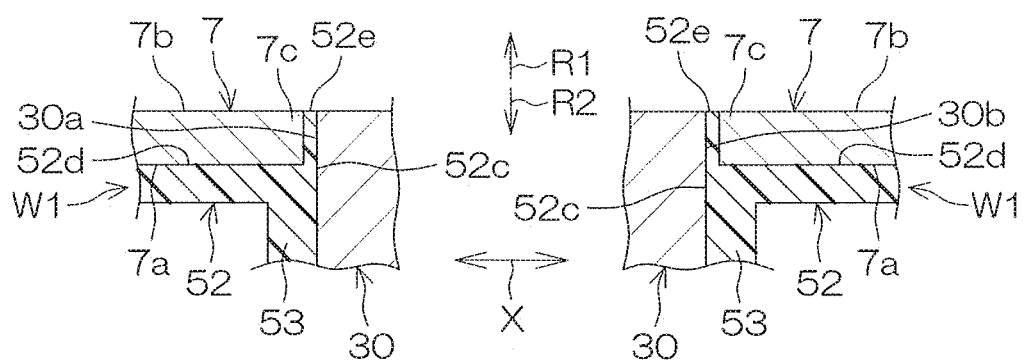
FIG. 15B is an enlarged cross-sectional view of a main portion of the stator core assembly.

FIG. 12 is a perspective view of a stator core assembly U including the stator core 30. FIG. 13 is a plan view of the stator core assembly U. FIG. 14 is a side view of the stator core assembly U. FIG. 15A is a longitudinal cross-sectional view of the stator core assembly U, and corresponds to a cross-sectional view taken along H-H in FIG. 13. FIG. 15B is an enlarged cross-sectional view of partially enlarged FIG. 15A. FIG. 16 is a cross-sectional view taken along I-I in FIG. 14.

As shown in FIG. 12, FIG. 13, and FIG. 14, the stator core assembly U includes the stator core 30, the plastic portion 5, a metal ring 7, and the insulation paper 32 (refer to FIG. 15A and FIG. 18A). The stator core assembly U is a sub-assembly at a stage before the coil 31 is mounted. That is, at the time of manufacturing, the coil 31 is to be mounted on the stator core assembly U as a sub-assembly.

Next, description will be provided of the coil 31.

As shown in FIG. 5, the coil 31 includes a housed portion 31a and the first coil end 31b and the second coil end 31c as a pair of coil ends. The housed portion 31a is housed in the coil housing portion 35a of the slot 35. The first coil end 31b and the second coil end 31c protrude in the axial direction X from the first axial end surface 30a and the second axial end surface 30b of the stator core 30, respectively.

The coil 31 is mounted on the stator core 30 in a state of being housed partially inside the plurality of slots 35. The coil 31 is a 3-phase coil consisting of a U-phase, a V-phase, and a W-phase. Each phase coil is insulated from the stator core 30 through the insulation paper 32 located in the slot 35.

Each phase coil 31 is constructed, for example, by mutually connecting a plurality of segment coils 36 (refer to FIG. 7). FIG. 17 is a schematic view showing a disposition example of the segment coil 36 when the stator core 30 is viewed from a radially inward R1 side. As shown in FIG. 17, the segment coil 36 includes a pair of inserting portions 36a, a bridging portion 36b, and a pair of extended portions 36c, 36d. The pair of inserting portions 36a are inserted into the slots 35 different from each other. The bridging portion 36b couples one ends of the pair of inserting portions 36a with each other. The pair of extended portions 36c, 36d are respectively extended from the other ends of the pair of inserting portions 36a.

The bridging portion 36b is located by extending out from either one of the axial end surfaces (for example, the first axial end surface 30a) of the stator core 30, and defines a portion of the coil end. The pair of extended portions 36c, 36d are located by extending out from the other axial end surface (for example, the second axial end surface 30b) of the stator core 30, and defines a portion of the coil end. Each of the extended portions 36c, 36d is connected with the extended portions 36c, 36d of another segment coil 36 by welding, etc.

Specifically, in the first coil end 31b, the bridging portion 36b of the segment coil 36 includes a pair of inclined portions 36e that are inclined in mutually opposite directions with respect to the axial direction X as viewed from a radially inward R1 side. An apex portion 36h of the bridging portion 36b is provided at the intersection of the pair of inclined portions 36e.

In the second coil end 31c, the segment coil 36 includes an inclined portion 36f and a joint end portion 36j at one extended portion 36c. The inclined portion 36f is inclined with respect to the axial direction X as viewed from a radially inward R1 side. The joint end portion 36j defines an extended end portion of the one extended portion 36c and extends, for example, in the axial direction X. The joint end portion 36j is joined with the joint end portion 36j of another segment coil 36 by, for example, welding.

Further, in the second coil end 31c, the segment coil 36 includes an inclined portion 36g and a joint end portion 36k at the other extended portion 36d. The inclined portion 36g is inclined with respect to the axial direction X as viewed from a radially inward R1 side. The joint end portion 36k defines an extended end portion of the other extended portion 36d and extends, for example, in the axial direction X. The joint end portion 36k is joined with the joint end portion 36k of another segment coil 36 by, for example, welding.

Here, a maximum protrusion height of the inclined portion 36e of the segment coil 36 from the first axial end surface 30a of the stator core 30 is provided as H1. Further, a maximum protrusion height of the inclined portion 36f of the one extended portion 36c of the segment coil 36 from the second axial end surface 30b of the stator core 30 is provided as H2. Further, a maximum protrusion height of the inclined portion 36g of the other extended portion 36d of the segment coil 36 from the second axial end surface 30b of the stator core 30 is provided as H3.

Next, description will be provided of the insulation paper 32.

As shown in FIG. 15A, the insulation paper 32 is located in the coil housing portion 35a of the slot 35. The insulation paper 32 includes a housed portion 32a and a pair of protruding portions 32b. The housed portion 32a is housed in the coil housing portion 35a of the slot 35. Each of the pair of protruding portions 32b protrudes in the axial direction X from a corresponding axial end surface 30a, 30b of the stator core 30.

As shown in FIG. 18A, the insulation paper 32 is provided, as viewed in the axial direction X, as a groove and includes a bottom portion 32c and a pair of side portions 32d. The bottom portion 32c of the insulation paper 32 is located along the bottom wall surface 35c. Each of the pair of side portions 32d of the insulation paper 32 is located along a corresponding side wall surface 35d.

However, in place of the insulation paper 32, an insulating plastic layer that is coated on the inner wall surface of the slot 35 may be used, although this is not illustrated.

Next, description will be provided of the plastic portion 5.

As shown in FIG. 15A, the plastic portion 5 is integral with the stator core 30. The plastic portion 5 includes a plurality of blocking portions 51 (third portions, refer to FIG. 16), a pair of cylindrical walls 52 (second portions), a pair of covering portions 53 (first portions), and a plurality of reinforcing portions 54 (refer to FIG. 18B). Each covering portion 53 includes an annular covering portion 55 and a plurality of arm portions 56.

As shown in FIG. 18B, which is a partially enlarged view of FIG. 16, each blocking portion 51 extends in the axial direction X so as to block the slot opening portion 35b of a corresponding slot 35. Each blocking portion 51 blocks the slot opening portion 35b from the inside of the slot 35, that is, a radially inward R1 side. Each blocking portion 51 blocks the slot opening portion 35b so as not to protrude radially inward R1 from the tip ends 34b of the teeth 34 adjacent to each other in the circumferential direction Y. Each blocking portion 51 has one end 51a and the other end 51b in the axial direction X.

The blocking portion 51 is held by apex surfaces of a pair of protrusions 34c in the slot opening portion 35b. A portion of the blocking portion 51 enters the coil housing portion 35a. The blocking portion 51 is held, in the coil housing portion 35a, by the pair of side wall surfaces 35d and the pair of holding wall surfaces 35e of the pair of protrusions 34c. Thus, the blocking portion 51 is firmly held on the stator core 30.

As shown in FIG. 15A, the pair of cylindrical walls 52 are located on both sides in the axial direction X of the stator core 30. The pair of covering portions 53 are located on both sides in the axial direction X of the stator core 30. The pair of cylindrical walls 52 each protrude in the axial direction X from the corresponding one of the first axial end surface 30a and the second axial end surface 30b of the stator core 30. The pair of cylindrical walls 52 are concentric with the stator core 30. Each cylindrical wall 52 includes one end 52a in the axial direction X and the other end 52b in the axial direction X. The one end 52a of each cylindrical wall 52 includes a contact portion 52c that makes contact with a corresponding axial end surface (the first axial end surface 30a or the second axial end surface 30b) of the stator core 30.

The pair of cylindrical walls 52 are coupled with the plurality of blocking portions 51. One cylindrical wall 52 is coupled with the one ends 51a of the plurality of blocking portions 51. The other cylindrical wall 52 is coupled with the other ends 51b of the plurality of blocking portions 51. That is, the plurality of blocking portions 51 couple the pair of cylindrical walls 52 with each other.

Next, description will be provided of the metal ring 7.

As shown in FIG. 15A, the metal ring 7 is held on an inner peripheral surface 52d of each of the pair of cylindrical walls 52. The metal rings include a pair of the metal rings 7 on both sides in the axial direction X of the stator core 30, and are made of, for example, stainless steel. The metal ring 7 includes an outer peripheral surface 7a, an inner peripheral surface 7b, a one end portion 7c, and the other end portion 7d.

At least a portion of the outer peripheral surface 7a of the metal ring 7 is covered by and molded to the cylindrical wall 52 of the plastic portion 5. The metal ring 7 is held by the plastic portion 5. The metal ring 7 is integral with the cylindrical wall 52 and held on the stator core 30. First cylindrical walls W1 each including the cylindrical wall 52 and the metal ring 7 that are mutually integrated are provided as a pair. The pair of first cylindrical walls W1 are concentric with the stator core 30. The cylindrical wall 52 of the plastic portion 5 defines a portion of the first cylindrical wall W1.

The one end portion 7c of the metal ring 7 opposes the axial end surface 30a, 30b of the stator core 30 in the axial direction X. The one end portion 7c of the metal ring 7 is separated from the axial end surface 30a, 30b of the stator core 30.

Specifically, as shown in FIG. 15B, the one end 52a of the cylindrical wall 52 includes an interposing portion 52e that is interposed between the one end portion 7c of the metal ring 7 and the axial end surface 30a, 30b of the stator core 30. The plastic portion 5 includes the interposing portion 52e. The interposing portion 52e defines a portion of the first cylindrical wall W1. The contact portion 52c is provided in the interposing portion 52e. The interposing portion 52e includes the contact portion 52c. The interposing portion 52e may be provided over the entire periphery in the circumferential direction Y, or may be provided on a portion of the circumferential direction Y.

Further, as shown in FIG. 6, in terms of a protrusion height in the axial direction X from a corresponding axial end surface 30a, 30b of the stator core 30, a maximum protrusion height of the coil end 31b, 31c is higher than a maximum protrusion height of the metal ring 7.

Specifically, as shown in FIG. 17, in terms of the protrusion height in the axial direction X from the first axial end surface 30a of the stator core 30, a maximum protrusion height H1 of the inclined portions 36e of the segment coil 36 (maximum protrusion height of the apex portion 36h of the bridging portion 36b) corresponds to a maximum protrusion height of the coil end 31b. The maximum protrusion height of the first coil end 31b (maximum protrusion height H1 of the inclined portions 36e) is higher than a maximum protrusion height H4 (refer to FIG. 15A) of the metal ring 7.

Further, in terms of the protrusion height in the axial direction X from the second axial end surface 30b of the stator core 30, a maximum protrusion height of the second coil end 31c corresponds to a higher one of a maximum protrusion height of the joint end portion 36j and a maximum protrusion height of the joint end portion 36k of the segment coil 36 (in a case of mutually equal heights, both thereof). The maximum protrusion height of the second coil end 31c is higher than the maximum protrusion height H4 of the metal ring 7.

Further, in terms of the protrusion height in the axial direction X from the second axial end surface 30b of the stator core 30, the maximum protrusion height H2 of the inclined portion 36f and the maximum protrusion height H3 of the inclined portion 36g of the segment coil 36 are higher than the maximum protrusion height H4 of the metal ring 7.

Further, in terms of the protrusion height in the axial direction X from the second axial end surface 30b of the stator core 30, each joint end portion 36j, 36k of the segment coil 36 is located higher than the maximum protrusion height H4 of the metal ring 7.

As shown in FIG. 6, into one first cylindrical wall W1, the cylindrical wall 21b (second cylindrical wall W2) of the first cover housing 21 is insertion-fitted. The one first cylindrical wall W1 is fitted to the outer peripheral surface 21h of the cylindrical wall 21b of the first cover housing 21. Specifically, the inner peripheral surface 7b of the metal ring 7 of the one first cylindrical wall W1 is fitted to the outer peripheral surface 21h of the cylindrical wall 21b (second cylindrical wall W2) of the first cover housing 21.

The seal member 13 in the housing groove 21j on the outer peripheral surface 21h of the cylindrical wall 21b (second cylindrical wall W2) of the first cover housing 21 provides a seal between the inner peripheral surface 7b of the metal ring 7 of the one first cylindrical wall W1 and the outer peripheral surface 21h of the cylindrical wall 21b (second cylindrical wall W2).

Into the other first cylindrical wall W1, the cylindrical wall 22b (second cylindrical wall W2) of the second cover housing 22 is insertion-fitted. The other first cylindrical wall W1 is fitted to the outer peripheral surface 22h of the cylindrical wall 22b of the second cover housing 22. Specifically, the inner peripheral surface 7b of the metal ring 7 of the other first cylindrical wall W1 is fitted to the outer peripheral surface 22h of the cylindrical wall 22b (second cylindrical wall W2) of the second cover housing 22.

The seal member 14 in the housing groove 22j on the outer peripheral surface 22h of the cylindrical wall 22b (second cylindrical wall W2) of the second cover housing 22 provides a seal between the inner peripheral surface 7b of the metal ring 7 of the other first cylindrical wall W1 and the outer peripheral surface 22h of the cylindrical wall 22b (second cylindrical wall W2).

The housing 2 demarcates the first coil end cooling channel Q1 and the second coil end cooling channel Q2 at a radially outward R2 side of the first cylindrical wall W1 and the second cylindrical wall W2 that are mutually fitted together. The cooling liquid to cool the first and second coil ends 31b and 31c is caused to flow through the first coil end cooling channel Q1 and the second coil end cooling channel Q2.

As shown in FIG. 15A, the pair of covering portions 53 are coupled with the corresponding one of the cylindrical walls 52 and respectively cover the pair of axial end surfaces (the first axial end surface 30a and the second axial end surface 30b) of the stator core 30. As shown in FIG. 12, the annular covering portion 55 included in the covering portion 53 covers the axial end surface 33c of the yoke 33. The plurality of arm portions 56 extend along axial end surfaces 34d (refer to FIG. 11) of the teeth 34. As shown in FIG. 15A, the plurality of arm portions 56 included in the covering portion 53 couple the one end 52a as an axial end portion of the cylindrical wall 52 with the annular covering portion 55.

The annular covering portion 55 covers a portion of the axial end surface 33c of the yoke 33. As shown in FIG. 6, the axial end surface 33c of the yoke 33 includes an exposed portion 33d that is exposed to the first coil end cooling channel Q1 and the second coil end cooling channel Q2. The exposed portion 33d is located radially outward R2 of the annular covering portion 55. The exposed portion 33d is exposed to the first coil end cooling channel Q1 and the second coil end cooling channel Q2 at the radially outward R2 side of the annular covering portion 55.

As shown in FIG. 15A, the protruding portions 32b of the insulation paper 32 are held by the covering portion 53. Specifically, the protruding portions 32b of the insulation paper 32 are held by the annular covering portion 55. Further, in terms of a protrusion height in the axial direction X from the axial end surface 30a, 30b of the stator core 30, a maximum protrusion height H5 of the annular covering portion 55, which corresponds to a maximum protrusion height of the covering portion 53, is higher than a maximum protrusion height H6 of the protruding portion 32b.

As shown in FIG. 18B, the reinforcing portions 54 are located as a pair for each of the slots 35. The reinforcing portions 54 extend along the respective corner portions 35f of the slot 35 in the axial direction X (direction orthogonal to the page plane in FIG. 18B), and are coupled with the arm portions 56 of the covering portions 53. The reinforcing portions 54 couple the arm portions 56 of the pair of covering portions 53 with each other.

When the insulation paper 32 is inserted into the slot 35, as shown in FIG. 18B, the reinforcing portions 54 extend in the axial direction X so as to block between the curved concave inner surface 35g of the corner portion 35f and a corresponding side portion 32d of the insulation paper 32.

According to a preferred embodiment of the present invention, the plastic portion 5 includes the blocking portion 51 (refer to FIG. 18B) that extends in the axial direction X so as to block the slot opening portion 35b in the slot 35. Further, as shown in FIG. 6, the plastic portion 5 includes the cylindrical wall 52 that is coupled to the blocking portion 51 and protrudes farther in the axial direction X than the axial end surface (the first axial end surface 30a or the second axial end surface 30b) of the stator core 30. The first coil end cooling channel Q1 and the second coil end cooling channel Q2 are demarcated radially outward R2 of the cylindrical wall 52. Therefore, entry of the cooling liquid from the inside of the slot 35 into the rotor 4 side is prevented by the blocking portion 51, and an increase in mechanical loss is prevented. Further, as shown in FIG. 18B, because the blocking portion 51 is located in the slot opening portion 35b and blocks the slot opening portion 35b from the inside of the slot 35, the air gap AG (refer to FIG. 6) is freely set to any size. Therefore, the performance is increased.

Further, as shown in FIG. 6, the plastic portion 5 includes the covering portion 53 (refer to FIG. 12) that is coupled to the cylindrical wall 52 and covers the axial end surface 30a, 30b of the stator core 30. By providing the covering portion 53, holding rigidity of the cylindrical wall 52 is increased.

Further, the covering portion 53 includes the annular covering portion 55 that covers the axial end surface 33c of the yoke 33 of the stator core 30. Due to the annular covering portion 55, the holding rigidity of the cylindrical wall 52 is further increased.

Further, the annular covering portion 55 covers a portion of the axial end surface 33c of the yoke 33 to secure the holding rigidity of the cylindrical wall 52. Moreover, the exposed portion 33d of the axial end surface 33c of the yoke 33 is exposed to the first coil end cooling channel Q1 and the second coil end cooling channel Q2, by which cooling performance is improved.

Further, the exposed portion 33d is exposed to the first coil end cooling channel Q1 and the second coil end cooling channel Q2 at a radially outward R2 side of the annular covering portion 55. Therefore, the exposed portion 33d has an increased area, so that the cooling performance is improved.

Further, as shown in FIG. 13, the covering portion 53 includes the arm portion 56 that extends along the axial end surface 34d (refer to FIG. 11) of the tooth 34. As shown in FIG. 15A, the arm portion 56 couples the axial end portion (one end 52a) of the cylindrical wall 52 with the annular covering portion 55. Therefore, the holding rigidity of the cylindrical wall 52 is increased.

Further, as shown in FIG. 11, the corner portion 35f that is defined by the inner periphery 33b of the yoke 33 and the wall surface of the tooth 34 is included in the slot 35. As shown in FIG. 18B, the plastic portion 5 includes the reinforcing portion 54 that extends along the corner portion 35f in the axial direction X and is coupled with the arm portion 56 (refer to FIG. 12). Therefore, holding force to hold the arm portion 56 on the stator core 30 is increased.

Further, as shown in FIG. 15A, the arm portions 56 of the pair of covering portions 53 located on both sides in the axial direction X of the stator core 30 are coupled with each other by the reinforcing portion 54 (refer to FIG. 18B). Therefore, holding force to hold the pair of covering portions 53 on the stator core 30 is increased.

Moreover, as shown in FIG. 15A, the metal ring 7, the outer peripheral surface 7a of which is covered by the cylindrical wall 52 of the plastic portion 5, is held on the stator core 30 together with the cylindrical wall 52. Therefore, the holding rigidity of the cylindrical wall 52 is increased.

Further, the insulation paper 32 located in the coil housing portion 35a of the slot 35 includes the protruding portion 32b that protrudes in the axial direction X from the axial end surface 30a, 30b of the stator core 30. The protruding portion 32b is held by the covering portion 53 (specifically, the annular covering portion 55). The protruding portion 32b of the insulation paper 32 thus has a stable posture. Therefore, the stator core 30 is reliably insulated from the coil 31.

Further, as shown in FIG. 15A, in terms of the protrusion height in the axial direction X from the axial end surface 30a, 30b of the stator core 30, the maximum protrusion height H5 of the covering portion 53 (annular covering portion 55) is higher than the maximum protrusion height H6 of the protruding portion 32b of the insulation paper 32. Therefore, the stator core 30 is reliably insulated from the coil 31.

Further, as shown in FIG. 4, the communication channel (second communication channel 62) that communicates with the coil end cooling channel Q1, Q2 is provided between the outer peripheral surface 30c of the stator core 30 and the inner peripheral surface 20b of the cylindrical housing main body 20. Therefore, the stator core 30 is directly cooled by a cooling liquid that flows through the communication channel (second communication channel 62). Thus, the cooling performance is improved.

Further, the communication channel (second communication channel 62) is demarcated by the axial groove 30d (refer to FIG. 11) that is provided on the outer peripheral surface 30c of the stator core 30 at a radially outward R2 side of the tooth 34. Therefore, deterioration in the magnetic properties caused by the provision of an axial groove on the outer peripheral surface 30c of the stator core 30 is prevented. Further, the stator core 30 is directly cooled with a simple structure.

Further, the coil end cooling channel Q1, Q2 is filled with the cooling liquid. Therefore, the cooling effect is high.

The present invention is not limited to the preferred embodiments described above, and for example, the reinforcing portions 54 of the plastic portion 5 may not be provided. Further, in a case where the segment coils 36 of the coil 31 are made of conductor wires for which the conductor surface is coated with an insulating film, the insulation paper 32 may not be provided. Further, the metal ring 7 that is molded to the cylindrical wall 52 may not be provided. Further, a groove (for example, an axial groove) defining the second communication channel 62 may be provided on the inner peripheral surface 20b of the housing main body 20 instead of being provided on the outer peripheral surface 30c of the stator core 30.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric motor comprising:
a stator including a stator core and a coil, the stator core including a yoke extending in an axial direction along a rotational axis and annularly surrounding the rotational axis, a plurality of teeth located on an inner periphery of the yoke and spaced apart at intervals in a circumferential direction around the rotational axis, and a plurality of slots between adjoining teeth, each of the plurality of slots including a coil housing that houses the coil and a slot opening that opens the coil housing radially inward, the coil including a coil end that protrudes in the axial direction from an axial end surface of the stator core;
a rotor spaced radially inward from the stator by an air gap and rotatable around the rotational axis;

a plastic portion including a blocking portion which extends in the axial direction so as to block the slot opening, and a cylindrical wall which is coupled to the blocking portion, protrudes farther in the axial direction than the axial end surface of the stator core, and is concentric with the stator core, the plastic portion being integral with the stator core;

a housing to house the stator and the rotor, the housing defining a coil end cooling channel at a location radially outward from the cylindrical wall and in which a cooling liquid flows to cool the coil end.

2. The electric motor according to claim 1, wherein the plastic portion includes a covering portion coupled to the cylindrical wall that covers the axial end surface of the stator core.

3. The electric motor according to claim 2, wherein the covering portion includes an annular covering portion that covers an axial end surface of the yoke.

4. The electric motor according to claim 3, wherein the annular covering portion covers a portion of the axial end surface of the yoke; and the axial end surface of the yoke includes an exposed portion which is exposed to the coil end cooling channel.

5. The electric motor according to claim 4, wherein the exposed portion is exposed to the coil end cooling channel at a location radially outward from the annular covering portion.

6. The electric motor according to claim 3, wherein the covering portion includes an arm portion extending along an axial end surface of the plurality of teeth and couple an axial end portion of the cylindrical wall with the annular covering portion.

7. The electric motor according to claim 6, wherein each of the plurality of slots includes a corner portion defined by the inner periphery of the yoke and a wall surface of the plurality of teeth as viewed in the axial direction; and the plastic portion includes a reinforcing portion which extends along the corner portion in the axial direction, and is coupled with the arm portion.

8. The electric motor according to claim 7, wherein a pair of the covering portions are located on both sides of the stator core in the axial direction; and the reinforcing portion couples the arm portions of the pair of covering portions with each other.

9. The electric motor according to claim 2, wherein the stator includes an insulation paper in the coil housing, and including a protruding portion which protrudes in the axial direction from the axial end surface of the stator core, and is held by the covering portion.

10. The electric motor according to claim 9, wherein in terms of a protrusion height from the axial end surface of the stator core, a maximum protrusion height of the covering portion is higher than a maximum protrusion height of the protruding portion.

11. The electric motor according to claim 1, further comprising a metal ring including an outer peripheral surface covered by the cylindrical wall and which is held on the stator core.

12. The electric motor according to claim 1, wherein the housing includes a cylindrical housing main body into which the stator core is inserted; and a communication channel which communicates with the coil end cooling channel is provided between an outer peripheral surface of the stator core and an inner peripheral surface of the housing main body.

13. The electric motor according to claim 12, wherein the communication channel is defined by an axial groove on the outer peripheral surface of the stator core at a location radially outward of the plurality of teeth.

14. The electric motor according to claim 1, wherein the coil end cooling channel is filled with the cooling liquid.

* * * * *